United States Patent
Mishra et al.

(10) Patent No.: US 11,755,572 B1
(45) Date of Patent: Sep. 12, 2023

(54) SYSTEMS, METHODS, AND APPARATUS FOR NATURAL LANGUAGE QUERIES AND DATA VISUALIZATIONS

(71) Applicant: The Travelers Indemnity Company, Hartford, CT (US)

(72) Inventors: Bibek Mishra, Bhubaneswar (IN); Anubha Gupta, Hartford, CT (US); Reena Samuel, Monroe, CT (US)

(73) Assignee: The Travelers Indemnity Company, Hartford, CT (US)

( * ) Notice: Subject to any disclaimer, the term of this patent is extended or adjusted under 35 U.S.C. 154(b) by 309 days.

(21) Appl. No.: 16/913,936

(22) Filed: Jun. 26, 2020

(51) Int. Cl.
| | | |
|---|---|---|
| *G06F 16/2452* | (2019.01) | |
| *G06F 16/2457* | (2019.01) | |
| *G06F 16/242* | (2019.01) | |
| *G06F 40/284* | (2020.01) | |

(52) U.S. Cl.
CPC .... *G06F 16/24522* (2019.01); *G06F 16/2428* (2019.01); *G06F 16/2448* (2019.01); *G06F 16/24573* (2019.01); *G06F 40/284* (2020.01)

(58) Field of Classification Search
CPC .......... G06F 16/24522; G06F 16/2448; G06F 16/24573; G06F 16/2428; G06F 40/284
See application file for complete search history.

(56) References Cited

U.S. PATENT DOCUMENTS

| | | | |
|---|---|---|---|
| 10,817,527 B1 * | 10/2020 | Setlur | G06F 16/243 |
| 2008/0091408 A1 * | 4/2008 | Roulland | G06F 40/211 |
| | | | 707/E17.074 |
| 2014/0066044 A1 * | 3/2014 | Ramnani | H04W 8/24 |
| | | | 455/418 |
| 2018/0285746 A1 * | 10/2018 | Dunwoody | G06F 16/9535 |

* cited by examiner

*Primary Examiner* — Mark D Featherstone
*Assistant Examiner* — Ranjit P Doraiswamy
(74) *Attorney, Agent, or Firm* — RowanTree Law Group, PLLC; Carson C. K. Fincham

(57) ABSTRACT

Systems, apparatus, methods, and articles of manufacture provide for generation, execution, and visualization of data queries (e.g., SQL statements) and their results, based on natural language input from a user. In one example implementation, a dashboard system provides a voting lounge and personalized and crowdsourced dashboards.

20 Claims, 8 Drawing Sheets

SYSTEMS, METHODS, AND APPARATUS FOR NATURAL LANGUAGE QUERIES AND DATA VISUALIZATIONS

FIELD OF THE INVENTION

The present invention relates generally to systems for information retrieval, and more particularly to improvements in computerized systems for query generation, visualization, and optimization.

BACKGROUND OF THE INVENTION

Prior art systems are known for generating structured query language (SQL) queries and presenting information to users in enterprise environments. For example, prior art dashboards and other data visualization tools may be used to display the status of business analytics metrics, key performance indicators (KPIs), and important data points for an organization, department, team, or process. The typical dashboard-generation process can be described as including three phases: conceptualization, visualization, and finalization. All three phases are repeated sequentially, in an iterative manner, to achieve the final look and feel of a dashboard for a particular use. In a typical generation process, business intelligence (BI) analysts will spend significant time in the conceptualization phase working with users to identify business questions, naming KPIs, and shaping the data that is to be fed into the dashboard. On average, BI analysts spend 80% of their time on collection and preparation of data, and only 20% on finding insights in the relevant datasets. Accordingly, any query results are simply based on, and limited to, predefined user criteria that are set by users who typically depend on predefined KPIs and do not understand the inner workings and inter-relationships in the relevant data (and may not know what data is relevant). In addition to these technical disadvantages, prior art systems do not provide a social networking capability. Thus, the prior art systems are not optimized for either the development of SQL queries or the presentation of data sets resulting from those queries. The technical drawbacks of these prior art systems lead to slower development cycles for creating data visualization tools and inefficient use of computing resources.

SUMMARY OF THE INVENTION

According to some embodiments of the present invention, systems, methods, apparatus, articles of manufacture, and/or computer readable media (e.g., a non-transitory computer readable memory storing instructions for directing a processor of a device for creating and/or executing database queries) provide a process for generating database queries and/or presenting visual representations of results of database queries. In some embodiments, a process for generating and/or presenting visual representations of results of database queries (e.g., performed by a system and/or apparatus) comprises the following steps:
  a) comparing natural language query text to a database corpus of stored data elements;
  b) receiving user input indicating how to manage a word of the natural language query text that does not match any data element of the database corpus;
  c) generating a query builder collection based on the user input and the natural language query text; and
  d) generating a structured data query based on the query builder collection.

According to some embodiments of the present invention, systems, methods, apparatus, articles of manufacture, and/or computer readable media provide a process for generating database queries and/or presenting visual representations of results of database queries. In some embodiments, the process comprises the following steps:
  a) executing a structured data query to generate a data query result;
  b) selecting a data visualization for a user;
  c) generating a display of the data query result via a personalized data query dashboard based on the selected data visualization;
  d) receiving feedback information about the generated display of the data query results; and
  e) updating at least one data module of a database system based on the feedback information.

According to some embodiments of the present invention, systems, methods, apparatus, articles of manufacture, and/or computer readable media provide a process for generating database queries and/or presenting visual representations of results of database queries. In some embodiments, the process comprises one or more the following steps:
  a) receiving from a first user an indication that a word does not have a matching data element in a first data ecosystem;
  b) receiving from the first user an indication that the word matches a data element of a second data ecosystem;
  c) receiving a request of a user to add the data element of the second data ecosystem to the first data ecosystem (e.g., add to a database corpus associated with the first data ecosystem);
  d) receiving from a second user a vote on whether to add the data element of the second data ecosystem to the first data ecosystem (e.g., add to a database corpus associated with the first data ecosystem); and/or
  e) updating a community data query dashboard (e.g., adding a data representation to the dashboard, modifying a data representation already on the dashboard, or deleting a data representation from the dashboard) that is associated with the user and at least one other user.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
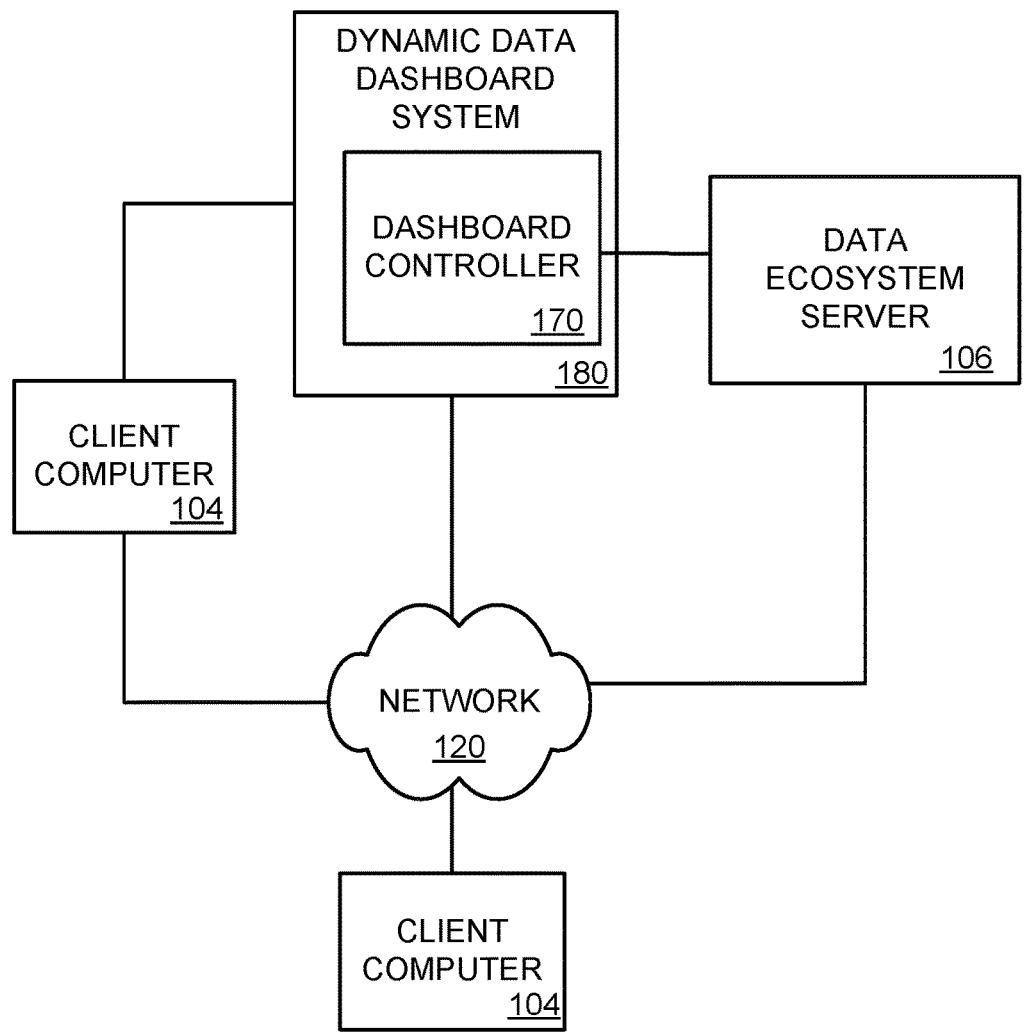
FIG. 1 is a block diagram of a system according to one or more embodiments.

According to some embodiments of the present invention, systems, methods, and apparatus for evaluating and/or optimizing database queries address technical problems associated with developing, maintaining, modifying, and/or optimizing data visualization tools, such as data dashboards for presenting results of structured data queries. The inventors have recognized that there is a need for technical improvements in data query generation and data query visualization processes and systems in order to expedite and improve the capabilities and suitability of data dashboards and to optimize the use of software development system resources.

According to some embodiments, a dynamic dashboard solves the technical problems of the prior art by exposing insights into relevant datasets based on one or more of: user context, user preferences, information requirements, best practices, and statistical importance. According to some embodiments, the dynamic dashboard system uses natural language conversations with users to further enhance context, providing a new user experience. It provides users with access to not only objective discoveries and personalized insights, but also to insights into the distribution process through collective feedback from other users and communities of users. Further, those skilled in the art will recognize that by automating processes of typical data collection and data preparation, the time saved will result in shorter development times for developing new dashboards and data visualization tools.

In accordance with one or more embodiments, a dynamic dashboard system solves technical deficiencies of the prior art systems by being interactive, responsive, and adaptive to user preferences, without requiring the long development cycles typical of prior art structured data query systems.

According to some embodiments of the present invention, systems, methods, apparatus, articles of manufacture, and/or computer readable media provide a process for dynamic creation of data visualizations based on feedback loops among users and between users and an interactive query and data visualization tool.

In accordance with some embodiments, a dynamic dashboard system and corresponding methods allow for the creation of feedback loops among users and between users and the tool, thereby facilitating group problem solving and reducing the prevalence of knowledge silos. In one example, a dynamic dashboard consistent with one embodiment encapsulates the entire process of dashboard generation (conceptualization, visualization, and finalization) into a single consolidated interface by self-learning, persisting user preferences, and retaining collective wisdom.

In addition to these technical advantages, non-technical advantages include the promoting of data literacy among business communities, which is important to the data culture of an organization. In accordance with one or more embodiments, a dynamic dashboard provides analytics-on-demand functionality to end users, allowing the users to assess and act on information in a timely manner. It improves user productivity by reducing time spent collecting and reviewing disparate sources of information. It further may promote greater collaboration between business & analytics by merging business functionality with information technology (IT) driven processes.

Although some examples may be described in this disclosure with respect to particular data queries and results, it will be readily understood that embodiments disclosed herein may be modified for use with any of various types of information, as deemed desirable for a particular implementation.

As will be understood by those of skill in the art, a data query (e.g., an SQL statement) may include any number of operations to retrieve, store, modify, and/or delete certain data stored in one or more data storage systems. A data query may, in some implementations, also include any number of operations to process any retrieved data. A data query may be expressed in a query language, such as SQL and/or expressed using other programming languages or other models.

According to some embodiments, the results of an executed data query may be presented (e.g., via a web-based interface and/or any type of visual interface) to a user as a data visualization. In one or more embodiments, a user and/or plurality of users may provide input or feedback to determine the parameters of a data visualization for a given set of data query results.

According to some embodiments, a data retrieval and visualization tool (referred to in this disclosure as a dashboard or data dashboard) provides an easy-to-use interface that users can interact with using a conversational style (e.g., in the user's native language) to receive data query results and insights at a personalized and/or collective or community level. In one example implementation, a dashboard tool in accordance with one embodiment leverages natural language processing and provides insightful functions, including one or more of the following a) Assisted Data Exploration: The tool accepts user input in both text or voice form and can respond to user questions in text, visualizations, and/or tabular form.

b) Personalized Insights: A personalized version of the dashboard derives meaning from user input based on the user's context and provides insights tailored to the specific user.

c) Crowdsourced Dashboard Build: A crowdsourced version of the tool allows multiple users to interact with it. The tool gathers inputs from multiple users and modifies data visualizations and other types of data representations based on the collective feedback of a plurality of users.

In accordance with one or more embodiments described in this disclosure, some or all steps of a data dashboard development life cycle may be improved, and technical weaknesses overcome, using specific configurations of features and/or hardware to provide for automatic evaluation of user input, data query optimization, data visualization, and/or managed propagation of selected data dashboard customizations by a user, for the users of a given data ecosystem or community, and/or among data ecosystems and communities.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used herein, the term "user" may generally refer to any type, quantity, and/or manner of individual that uses a system for creating, evaluating, optimizing, and/or displaying results of data queries, as described with respect to various embodiments in this disclosure.

Some embodiments described herein are associated with a "user device" or a "network device." As used herein, a user device comprises a subset of a network device. The network device, for example, may generally refer to any device that can communicate via a network, while the user device may comprise a network device that is owned or operated by or otherwise associated with any type of user (e.g., a developer of a data visualization tool, a user of a data query dashboard application). Examples of user and/or network devices may include, but are not limited to: a personal computer (PC), a computer workstation, a computer server, a smartphone, a tablet computer, and/or a wireless or cellular telephone. User, customer, and/or network devices may comprise one or more network components.

As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may comprise or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium, such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include, but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

As used herein, "determining" includes calculating, computing, deriving, looking up (e.g., in a table, database, or data structure), ascertaining, and/or recognizing.

As used herein, "processor" means any one or more microprocessors, Central Processing Unit (CPU) devices, computing devices, microcontrollers, and/or digital signal processors. As used herein, the term "computerized processor" generally refers to any type or configuration of primarily non-organic processing device that is or becomes known. Such devices may include, but are not limited to, computers, Integrated Circuit (IC) devices, CPU devices, logic boards and/or chips, Printed Circuit Board (PCB) devices, electrical or optical circuits, switches, electronics, optics, and/or electrical traces. As used herein, "mechanical processors" means a sub-class of computerized processors, which may generally include, but are not limited to, mechanical gates, mechanical switches, cogs, wheels, gears, flywheels, cams, mechanical timing devices, etc.

FIG. 1 depicts a block diagram of an example system 100 for providing a dynamic and interactive data dashboard providing for structured data query generation and data visualization, according to some embodiments. Although reference may be made in this disclosure to examples of web applications and/or enterprise applications, it will be readily understood that disclosed embodiments may be useful with respect to various types of applications.

The system 100 may comprise one or more client computers 104 in communication with a dynamic data dashboard system 180 via a network 120. A dashboard controller 170 is integrated into the dynamic data dashboard system 180, for example, as an embedded module, a portal, or other functionality accessible through and/or by the dynamic data dashboard 180. In one embodiment, information stored by the dynamic data dashboard 180 may be provided advantageously to the dashboard controller 170 for data query and/or data visualization processing. For example, stored information about historical data queries, user preferences for data queries, and/or data visualizations, may be provided to or otherwise accessible by the dashboard controller 170 without requiring manual input (e.g., from a user or developer).

In some embodiments, the dynamic data dashboard system 180 may be hosted by a controller or server computer (e.g., a computer specially programmed to provide for one or more of the functions described in this disclosure). Typically, a processor (e.g., one or more microprocessors, one or more microcontrollers, one or more digital signal processors) of a client computer 104 or a server computer will receive instructions (e.g., from a memory device or like device), and execute those instructions, thereby performing one or more processes defined by those instructions. Instructions may be embodied in, for example, one or more computer programs and/or one or more scripts.

In some embodiments the dynamic data dashboard system 180 and/or one or more of the client computers 104 stores and/or has access to data useful for facilitating various data dashboard functions. According to some embodiments, any or all of such data may be stored by or provided via one or more data ecosystem servers 106 of system 100. A data ecosystem server 106 may comprise, for example, an external computing system, a virtual computing environment, or a remote computer system for storing and serving data, such as database corpuses, user information, data query results, data visualization parameters data, or a combination of such remote and local data devices.

In some embodiments, the dynamic data dashboard system 180 may store some or all of the program instructions, and a client computer 104, such as a computer workstation or terminal of a user (e.g., an end user of a data visualization tool), may execute the application remotely via the network 120, and/or download from the dynamic data dashboard system 180 (e.g., embodied as a web server) some or all of the program code for executing one or more of the various functions described in this disclosure. In some embodiments, a client computer 104 is used to execute an application, stored locally on the client computer 104, that accesses information stored on, or provided via, the dynamic data dashboard system 180, data ecosystem server 106, one or more other client computers 104, and/or network 120.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers 104 and/or server computers will be readily understood by one skilled in the art upon contemplation of the present disclosure.

Figure 2:
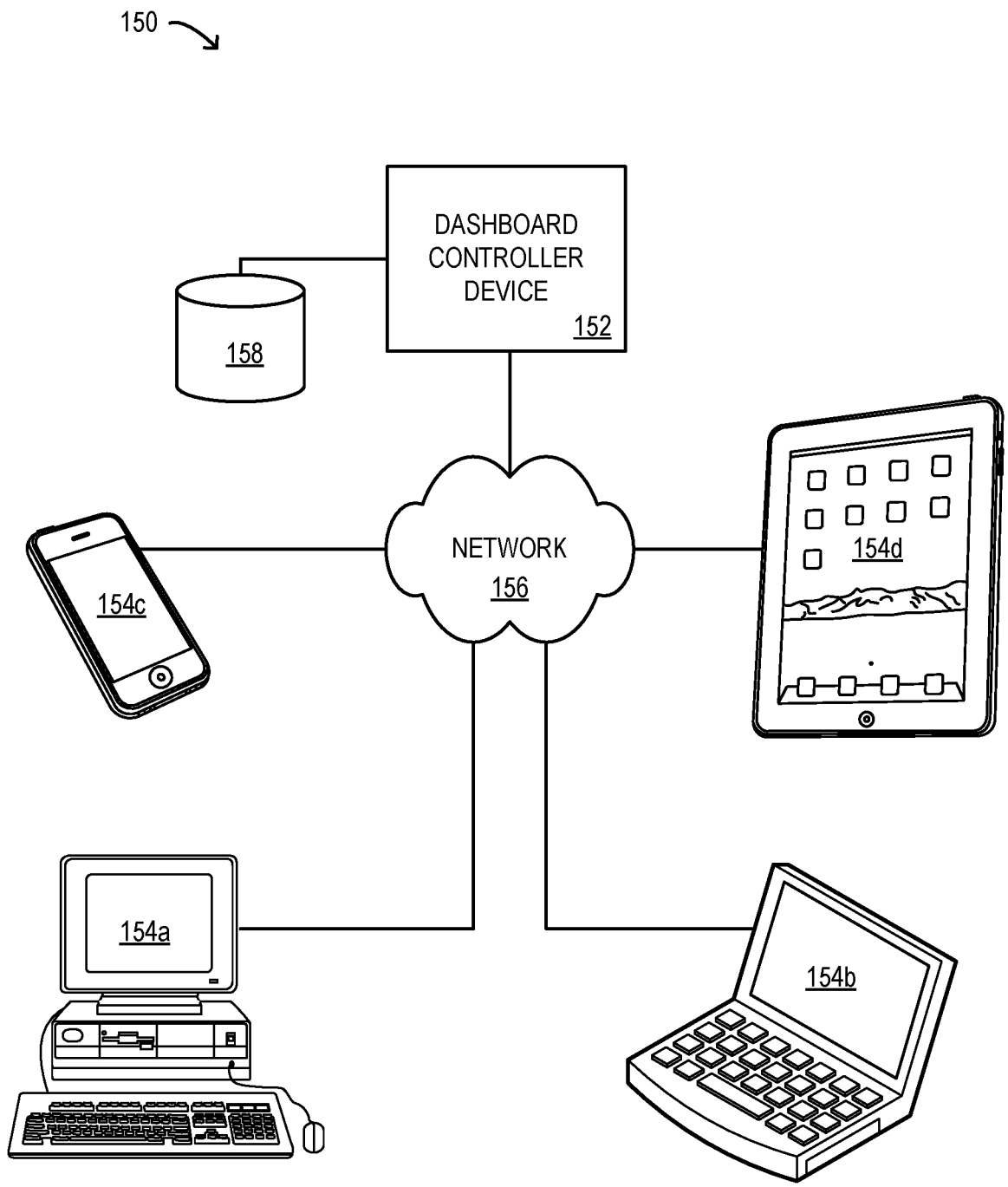
FIG. 2 is a block diagram of a system according to one or more embodiments.

FIG. 2 depicts a block diagram of an example system 150 according to some embodiments. The system 150 may comprise one or more user devices 154a-d in communication with a dashboard controller device 152 via a network 156. According to some embodiments, the dashboard controller device 152 may be in communication with one or more databases 158.

In some embodiments, the dashboard controller device 152 may comprise one or more electronic and/or computerized controller devices, such as computer servers communicatively coupled to interface with the user devices 154a-d (directly and/or indirectly). The dashboard controller device 152 may, for example, comprise one or more devices as discussed with respect to dynamic data dashboard system 180. According to some embodiments, the dashboard controller device 152 may be located remotely from the user devices 154a-d. The dashboard controller device 152 may also or alternatively comprise a plurality of electronic processing devices located at one or more various sites and/or locations.

The user devices 154a-d, in some embodiments, may comprise any types or configurations of electronic network, user, and/or communication devices that are or become known or practicable, including any types of mobile, portable, wearable, and/or Internet-enabled "smart" consumer devices (e.g., smart watches, Internet of things (IOT) devices, smart televisions and displays, and personal assistant devices such as Apple, Inc.'s Alexa™). User devices 154a-d may, for example, comprise cellular and/or wireless telephones, such as an iPhone® manufactured by Apple, Inc. of Cupertino, Calif. or Optimus™ S smart phones manufactured by Samsung Inc., and running the Android® operating system from Google, Inc. of Mountain View, Calif. The user device 154a may, as depicted, for example, comprise a personal or desktop computer (PC), the user device 154b may comprise a laptop computer, the user device 154c may comprise a smartphone, and the user device 154d may comprise a tablet computer. It will be readily understood that while certain example devices are depicted in FIG. 2, other types of devices may be used in addition to or in lieu of the examples shown.

Typically, a processor (e.g., one or more microprocessors, one or more microcontrollers, one or more digital signal processors) of a user device 154a-d or dashboard controller device 152 will receive specially programmed instructions (e.g., from a memory or like device), execute those instructions, and perform one or more processes defined by those instructions. Instructions may be embodied for example, in one or more computer programs and/or one or more scripts.

In some embodiments, the dashboard controller device 152 and/or one or more of the user devices 154a-d stores and/or has access to data useful for providing one or more functions described in this disclosure, in a manner similar to that described with respect to system 100.

In some embodiments, the example system 150 may comprise a query generation system, at least one data source (also referred to in this disclosure as a database corpus), and/or a query execution environment. In some embodiments, the system may comprise a plurality of software programs (e.g., computer-readable instructions executable by a CPU), at least one CPU, query personalization data, data visualization data, and/or data storage devices.

Any component described with respect to various embodiments of the present invention may comprise a single device, a combination of devices, and/or a plurality of devices, as is or becomes desirable and/or practicable. Similarly, in some embodiments, one or more of the various components may not be needed and/or desired in a particular implementation.

According to some embodiments, at least one data source may be coupled to, configured to, oriented to, and/or otherwise disposed to provide and/or communicate data to a CPU of a dashboard system and/or to a query execution environment. Query data sources may include database corpuses from one or more data ecosystems, which may be associated with one or more users. A user may have access to one or more different data ecosystems; each data ecosystem will have its dedicated database corpus, crowdsourced dashboard, and personalized dashboard for each user.

In some embodiments, natural language text may be processed in accordance with a query generation module. In some embodiments, a data query generated by the query generation module may provide the resulting SQL data query (e.g., generated at least in part based on a user's association of a word of the natural language text with a particular data element) to a query execution environment for execution by a controller device using a query execution procedure.

In some embodiments, information related to the execution of the data query (e.g., a copy of the data query, information about performance of the data query, information about resource cost of the executed data query, information about data retrieved using the query) may be stored as query execution data and/or transmitted to a database of the dynamic data dashboard system. According to some embodiments, the query execution data, which may include information about a plurality of historical data queries, user preferences, and associations of certain words with data elements of one or more database corpuses, may be used by the query generation system and/or data visualization system in generating data queries and visualizations.

According to some embodiments, the execution of stored procedures in a dynamic data dashboard system may define, identify, calculate, create, reference, access, update and/or determine one or more data tables or other data stores or database corpuses.

In some embodiments, a query transformer may be used to parse, translate, and/or otherwise process the historical queries to assist in cleaning up and transforming natural language text for use in generating an SQL query and/or related data visualization. In one example, a query transformer includes instructions for one or more of: extracting all words in natural language text; converting dates in queries to standardized text string formats; and identifying and/or removing one or more types of stop words (e.g., "and", "or", "null". "as", "on", "is", "by", "case", "when" "then" "else", "end" "sum" "< >" "<=" ">=" "<" ">" "=" "left", "right"). In one example, the natural language text input by a user and processed by a query transformer results in an output text string that is a transformation of the original natural language text.

Figure 3:
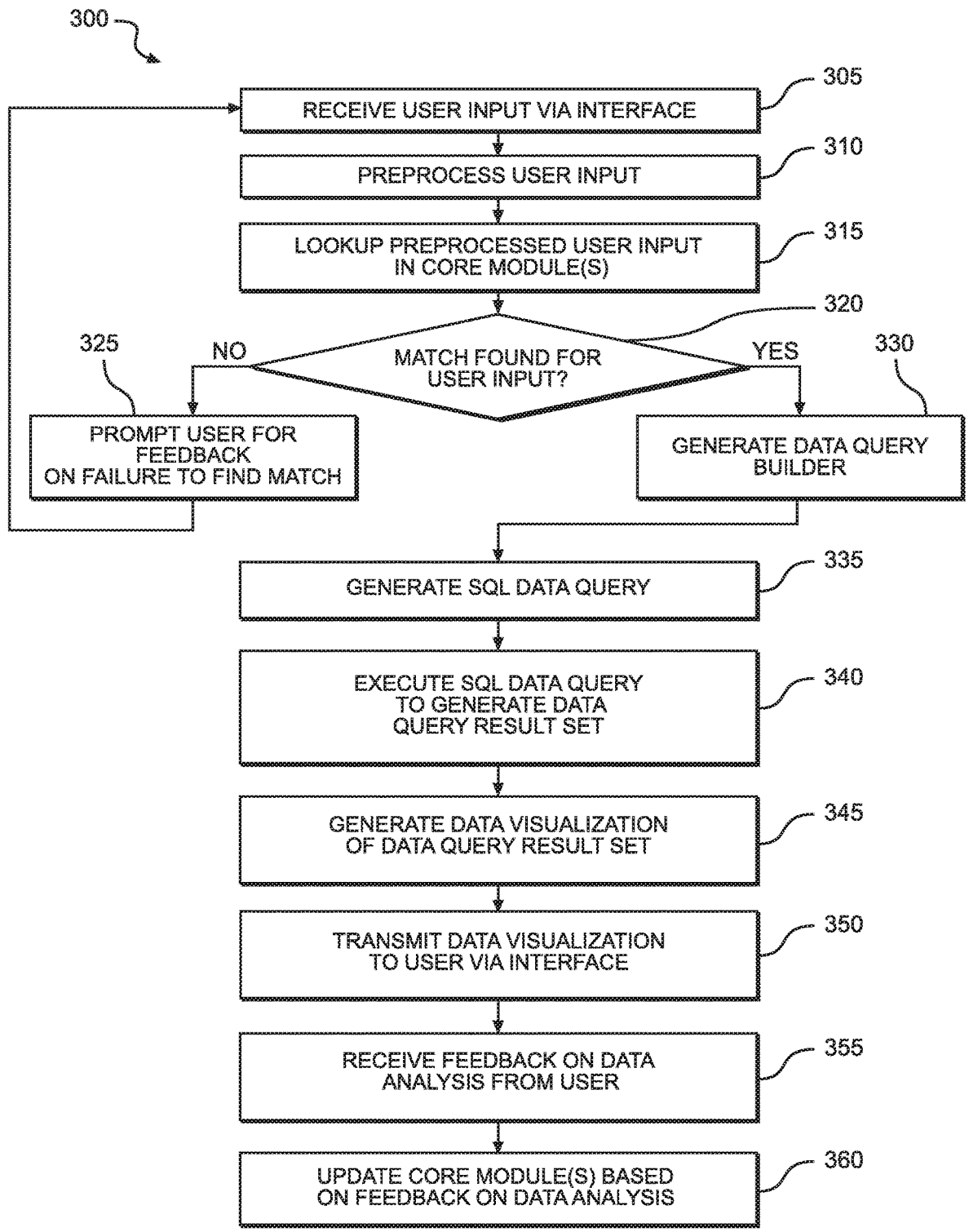
FIG. 3 is a flowchart of a method according to one or more embodiments.

Referring now to FIG. 3, a flow diagram of a method 300 according to some embodiments is shown. The method 300 may be performed, for example, by a dashboard controller and/or dynamic data dashboard system.

According to some embodiments, the method 300 may comprise receiving user input via an interface, at 305 (e.g., from a user via a connected network device). In one embodiment, the user input comprises natural language query text describing a data search that the user wants to run. In one embodiment, receiving the user input may comprise receiving, by a dashboard controller system, natural language query text of a user, wherein the natural language query text is indicative of a request of the user for information from a database system.

The method 300 may further comprise preprocessing the user input, at 310. Some examples of preprocessing are described in detail below. In one embodiment, preprocessing comprises transforming (e.g., by a dashboard controller system), each word of the natural language query text to a respective base lemma. In this way, in accordance with some embodiments, a dashboard system may generate a set of one or more transformed words that correspond to the natural language query text input by a user.

The method 300 may further comprise looking up preprocessed user input in one or more core modules, at 315. In some embodiments, looking up may be part of a comparison process. For example, a dashboard controller system may compare each transformed word of a set of transformed words to a database corpus of stored data elements (e.g., associated with one or more ecosystems) to determine whether the transformed word has a respective matching data element in that database corpus. The comparing may identify one or more transformed words that are unmatched, i.e., the system did not identify a respective data element in the relevant database corpus that is a match for the transformed words.

At 320, if a match is found for the preprocessed user input, the method 300 may proceed to generating a data query builder, at 330. Otherwise, the method 300 may proceed to prompt the user for feedback on the failure to find a match (and/or take one or more other actions, as described in this disclosure), at 325, and then resume the method 300 at 305 to await the receipt of additional user input.

As discussed in this disclosure, some embodiments provide for a "query builder" or "data query builder." A query builder is a collection that stores sufficient information on different aspects of a data query (e.g., projection columns, aggregation columns, tables, joins, filters aggregation conditions) required for successful generation of the data query. Every query may not need all these dimensions; accordingly, the query builder may contain only the dimensions necessary to build the specific data query being processed. The following table outlines some example elements of a data query builder:

In one example of a data query for insurance policy quotes related to self-driving cars, the query builder collection may be represented as:

query_builder:
{
INT_ANL_OUT_FORMAT: text,
INT_ANL_AGG: count:[quote_policy.quote_nbr],
TIME_FORMAT: YYYY-MMM,
COLS=None,
TABLE: [quote_policy],
FILTERS: [quote_policy: [(product, self_cars)]]
}

According to some embodiments, if a match is not found for some portion of preprocessed user input, a dashboard system may take one or more of various types of actions to try to resolve the missing information. Actions may include but are not limited to: transmitting to a user a suggested data element to which to map an unmatched transformed word; and/or requesting from a user a user input to assist in correlating the first unmatched transformed word. Additional user input may be received in response to the suggested data element and/or in response to the explicit request for the user's assistance.

In some embodiments, a dashboard controller system may receive a user response to the suggested data element and/or to the request for input. Example user responses include but are not limited to the following:

a) an indication that the unmatched transformed word is a stopword, b) an indication of acceptance by the user of the suggested first data element, c) an indication of a second data element (e.g., different from the suggested first data element) in the database corpus to which to map the unmatched transformed word, d) an indication that the unmatched transformed word is a data visualization type indicator, e) an indication that the unmatched transformed word does not have a respective matching data element in a data ecosystem corresponding to the database corpus, and/or f) an indication that the unmatched transformed word matches a data element of a second data ecosystem.

| Element Name | Element Representation | Description |
| --- | --- | --- |
| INT_ANL_OUT_FORMAT | | Output format (Grid/Text, Graph, or Value) |
| INT_ANL_AGG | [agg1: [col1, col2, . . ., . . .], [agg2: [col3, . . . ]]] | What aggregations are used and on what columns |
| TIME_FORMAT | [tm_frmt1: [col1, col2, , , , , ,] . . . . . .] | How the date variables are represented |
| COLS | [col1, col2] | Columns represented in the output (any form) |
| TABLES | [table1: [table2, cols = [. . ., . . .], Inner Join], table2: [(table1, cols = [. . . , . . .], Inner join)] | Mention the list of all tables with information on best join criteria between them |
| FILTERS | [table: [(column1, element_list), table: [(column2, element_list)] | Mention lineage information (e.g., table, column, element list)) of all filters to be applied in query to limit data |

In some embodiments, generating the data query builder at 330 may comprise generating a query builder collection that is based on any user response and the preprocessed user input (e.g., a set of transformed words). After generating the data query builder at 330, the method 300 may further comprise generating an SQL data query, at 335, and executing the SQL data query (e.g., against at least one data table of a database system) to generate a data query result set, at 340. Generating the SQL data query, in some embodiments, comprises generating the structured data query based on the associated query builder collection.

In accordance with some embodiments, as described in this disclosure, a visualization of the data query result set may be transmitted to one or more users (e.g., via a web-based interface). The method 300 may comprise, at 345, generating a data visualization of the data query result set that was generated at 340. In some embodiments, generating the data visualization may comprise selecting a data visualization for the user (e.g., a personalized visualization) and/or generating a display of the data query result (e.g., via a personalized data query dashboard) based on the selected data visualization for the user. The method 300 may further comprise transmitting the data visualization to at least one user via an interface, at 350.

In accordance with some embodiments, the method 300 may further comprise receiving feedback on the data analysis from at least one user, at 355, and updating one or more core modules based on received feedback, from at least one user, about the data analysis (e.g., an assessment of the search results and/or data visualization), at 360. Some embodiments may further comprise transmitting a request (e.g., via a user interface) for feedback information about the generated display of the data query result (e.g., after transmitting the data visualization at 350). In accordance with one or more embodiments a method may comprise updating at least one data module of a database system based on any received feedback information.

The method 300 describes features of a method that may be applicable to a personalized dashboard and/or to a shared or crowdsourced dashboard of a data ecosystem. An "ecosystem" or "data ecosystem," as used in this disclosure in accordance with some embodiments, refers to a set of (i) multiple personalized dashboards corresponding to individual users, (ii) a voting lounge (VL) environment and functionality allowing users to vote on or otherwise influence the configuration of shared tools, and (iii) a crowdsourced dashboard or shared data visualization corresponding to and reflective of the preferences of the ecosystem's users as a whole.

In one or more embodiments, a "voting lounge" refers to a shared communications space or area in which users may collectively decide on various aspects of community or shared dashboards/crowdsourced dashboards and data ecosystems (e.g., through voting), including but not limited to:
  a) Decisions on what visualization content should appear on crowdsourced dashboards. This involves the addition of a visualization, modification of an existing visualization, and/or deletion of a visualization.
  b) Decisions on updates to the underlying information architecture (e.g., table structure) associated with a shared dashboard/crowdsourced dashboards.
  c) Decisions on updates to the database corpus in an ecosystem, (e.g., after a user received personalized output based on a data element external to the ecosystem and the user believes the data element should be included and/or updated in the ecosystem for future queries).

In each ecosystem, users may have access to their own personalized dashboard, a voting lounge, and a crowdsourced dashboard for the ecosystem. For insight discovery across multiple domains, users may have access to multiple ecosystems.

In accordance with some embodiments, users may interact with their personalized dashboard, and the dashboard responds with insights (e.g., generated and transmitted by a dynamic data dashboard system). The user may, for example, decide to share the insight on a crowdsourced dashboard accessible by multiple users.

In some embodiments, the addition, modification, and deletion of visualizations on the personalized dashboard may become effective immediately. However, the addition, modification, and deletion of visualizations in a crowdsourced dashboard may be subject to a voting process.

In one example process, when a user intends to add a visualization to a crowdsourced dashboard, the visualization is copied to the voting lounge for voting. If, for example, the visualization gets positive votes higher than a predetermined threshold, the visualization is made available to the ecosystem and appears on the shared dashboard/crowdsourced dashboard.

If a user desires any modification to an existing visualization on a crowdsourced dashboard, the original, unmodified version of the dashboard continues to appear on the crowdsourced dashboard. In the meantime, the updated version of the dashboard may appear on the user's personalized dashboard for review. After the user's review is complete, the visualization may be moved to the voting lounge for input from other users. If, for example, the modification request receives positive votes higher than a predetermined threshold, the modified version replaces the original visualization on the crowdsourced dashboard.

If a user desires to delete a visualization included in a crowdsourced dashboard, the request is reviewed through voting in the voting lounge. The visualization may be taken down from the crowdsourced dashboard according to one or more predetermined criteria. For instance, the visualization may be removed: (1) if a predetermined minimum number of people vote that it should be deleted and/or (2) if the visualization gathers negative votes higher than a specific threshold.

Figure 4:
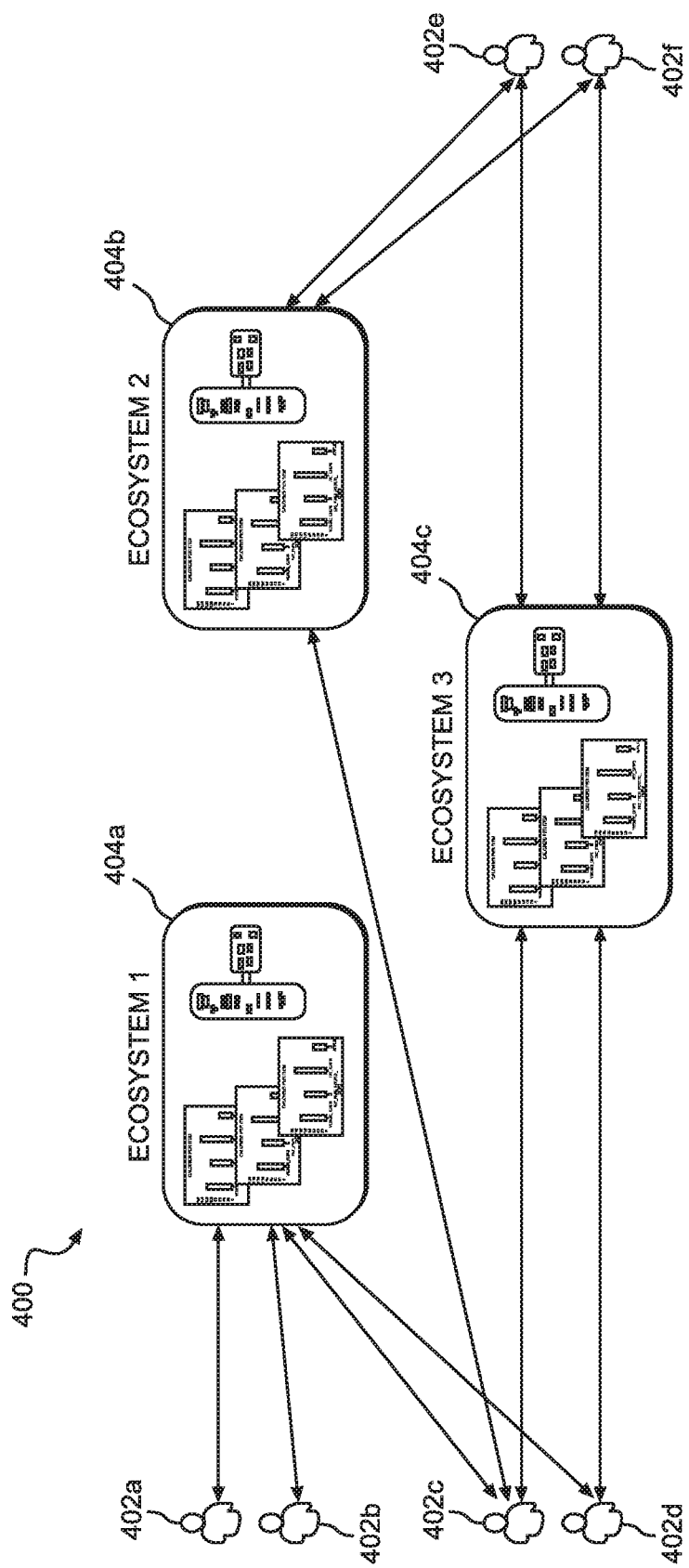
FIG. 4 is a block diagram of a system according to one or more embodiments.

Referring now to FIG. 4, an example system 400 of ecosystems is shown. The system 400 comprises a plurality of ecosystems 404*a*, 404*b*, and 404*c*. As indicated in the example system 400, each ecosystem 404*a*, 404*b*, and 404*c* comprises one or more personalized dashboards, a voting lounge, and a shared dashboard/crowdsourced dashboard. The example system 400 further comprises a plurality of users 402*a*, 402*b*, 402*c*, 402*d*, 402*e*, and 402*f*. In the example system 400, some users are associated with multiple ecosystems, some are associated with only one, and some are associated with all available ecosystems of the system 400.

Figure 5:
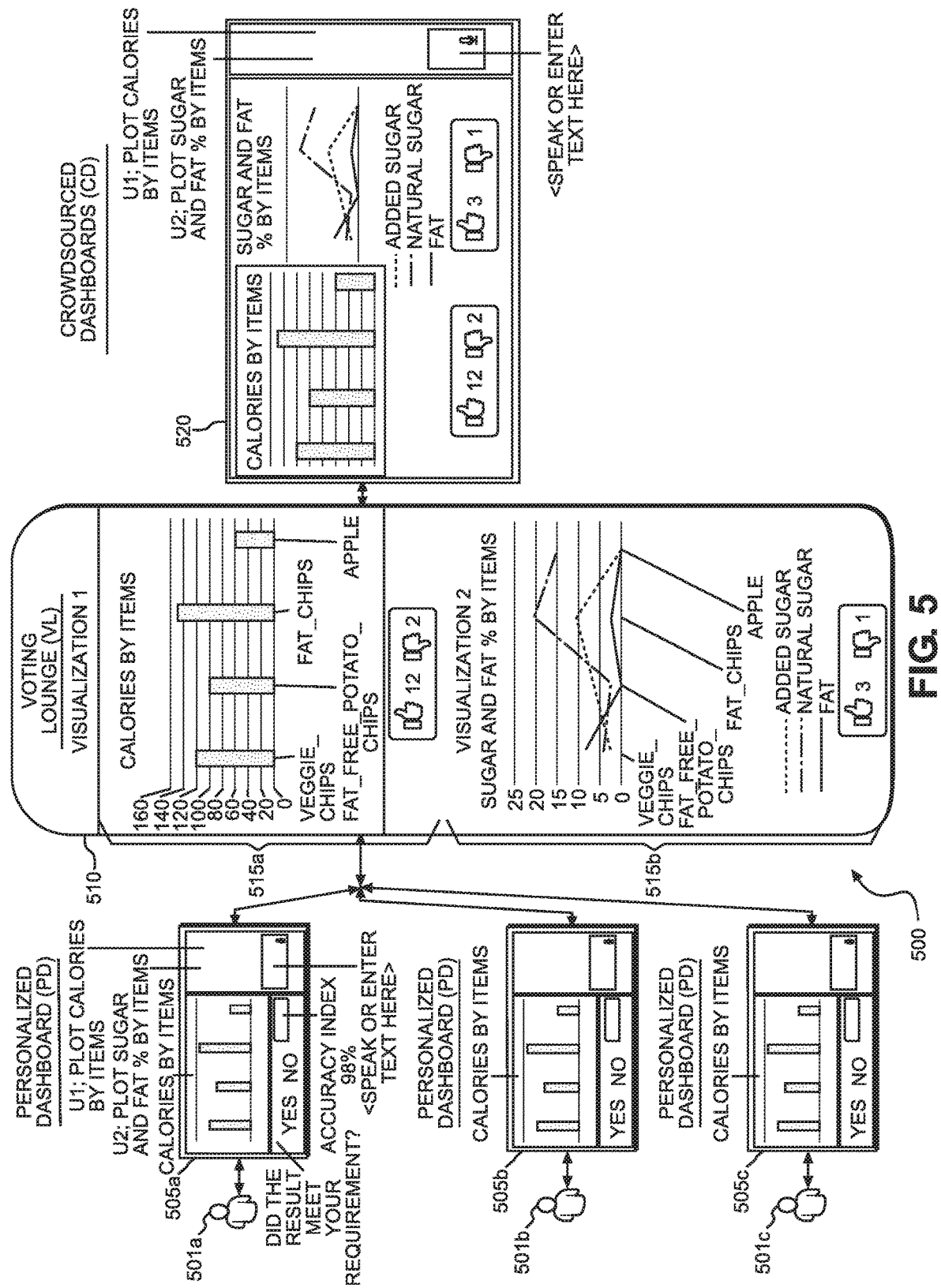
FIG. 5 is a block diagram of a system according to one or more embodiments.

Referring now to FIG. 5, an example ecosystem 500 is shown. The ecosystem 500 includes personalized dashboards 505*a*, 505*b*, and 505*c*, each of which is associated with an individual user 501*a*, 501*b*, and 501*c*, respectively. The example ecosystem 500 further comprises a voting lounge 510 and one or more crowdsourced dashboards 520. As shown in FIG. 5, example crowdsourced dashboard 520 includes two example data visualizations that have been voted on and accepted by users 501*a*, 501*b*, and 501*c* and are now available to all users of the ecosystem 500.

As shown in FIG. 5, a dashboard system in accordance with one or more embodiments of the present invention may allow users 501a, 501b, and 501c to post visualizations from their own personalized dashboards 505a, 505b, 501c (and/or certain features thereof) to the voting lounge 510 to be voted on by users of the ecosystem 500. According to some embodiments, a voting scheme (e.g., one vote per user; one vote per visualization, etc.) may be collectively decided by all users in an ecosystem. In the example ecosystem 500 shown in FIG. 5, the visualization 515a labeled "VISUALIZATION 1" is a particular bar graph of the results of a data query. The example visualization 515a, as shown, has been the subject of a vote by members of the ecosystem 500, with twelve users being in favor of and two users opposed to adding the visualization 515a to the crowdsourced dashboard 520 for the ecosystem. The example results of the voting on the example line graph of visualization 515b labeled "VISUALIZATION 2" is three in favor and one opposed.

Additional examples of shared data visualizations are described below with respect to FIG. 7 and FIG. 8.

As described in detail below with respect to some embodiments, for the dashboards to work effectively, certain modules may be prepared and updated with each data query. In one embodiment, the modules may include: (i) database corpus, (2) visualization analysis module, (3) user intent module, (4) visualization best practices module, and/or (5) accuracy metrics module.

Figure 6:
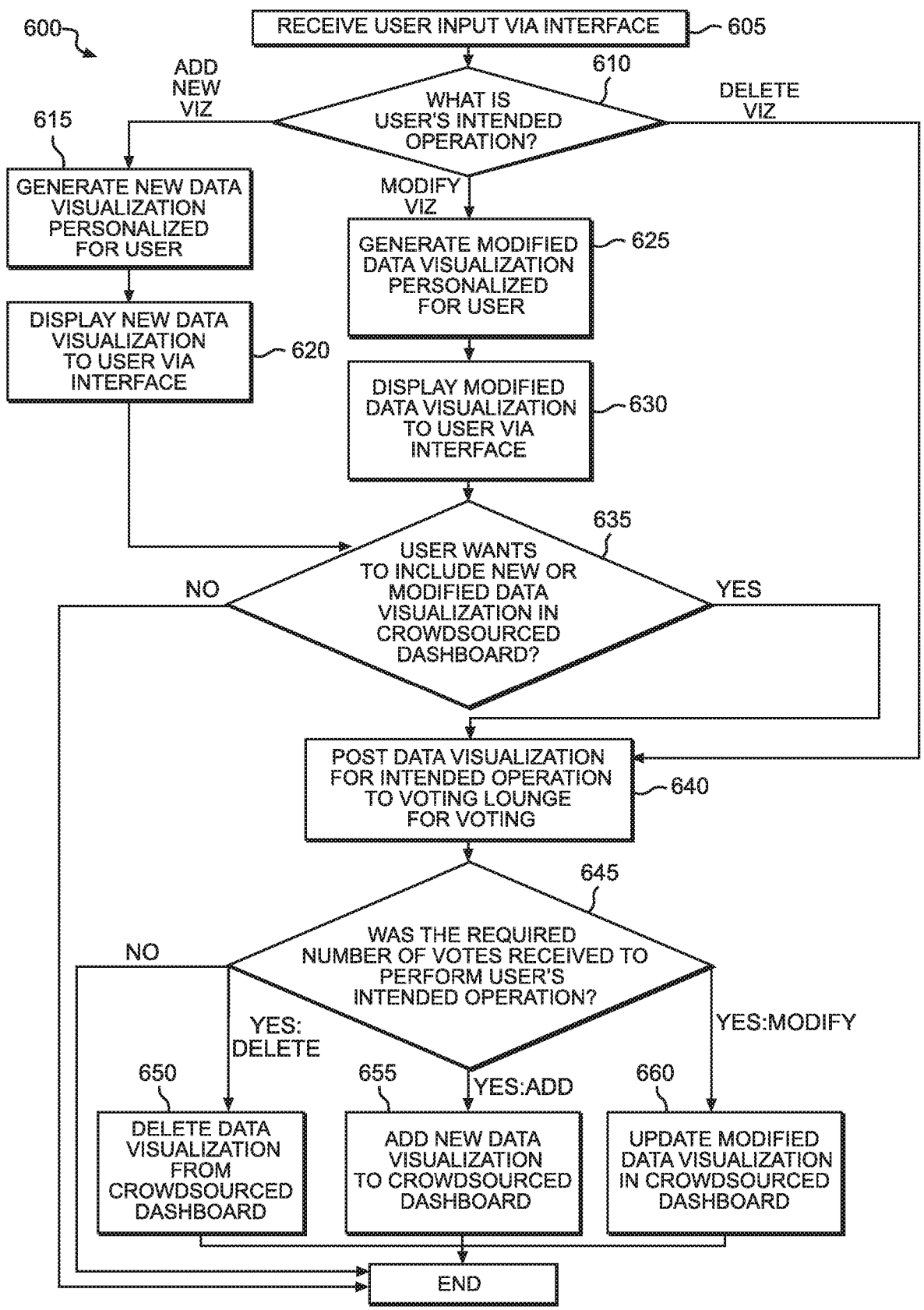
FIG. 6 is a flowchart of a method according to one or more embodiments.

Referring now to FIG. 6, a flow diagram of an example method 600 according to some embodiments is shown. The method 600 may be performed, for example, by a dynamic data dashboard system and/or dashboard controller device. According to some embodiments, the method 600 may comprise receiving user input via an interface. In one example, a user may provide an indication of an operation that the user wants to facilitate in a dashboard system (e.g., from a client device via a web-based application), at 605.

The method 600 may further comprise determining what intended operation the user wants to perform, at 610. Various types of operations may be enabled for a given dashboard controller system, as deemed appropriate for a desired implementation. As described in this disclosure, in some embodiments, a user may be able to add, modify, and/or delete data visualizations for a personalized dashboard (e.g., that a user may manipulate without requiring the approval of other users). In other embodiments, a user may be able to suggest additions, updates, and/or deletions of data visualizations for a crowdsourced dashboard (e.g., a shared or community dashboard accessible by multiple users). A suggested change to a crowdsourced dashboard may need to be approved by a group of users according to a predetermined voting scheme. It will be readily understood that any type and/or combination of operations for personalized dashboards and/or crowdsourced dashboards may be made available in a given dashboard system. According to some embodiments, one or more other types of operations may be implemented in addition to and/or in lieu of any of the example operations depicted in the example method 600.

In the example method 600, the potential intended operations may comprise adding a new data visualization to the user's personalized dashboard and/or to a crowdsourced dashboard (indicated by the "ADD NEW VIZ" option), generating a modified version of an existing data visualization on the user's personalized dashboard and/or on a crowdsourced dashboard (indicated by the "MODIFY VIZ" option), and/or deleting an existing data visualization from the user's personalized dashboard and/or a crowdsourced dashboard (indicated by the "DELETE VIZ" option).

If the user's intended operation is to delete a data visualization from the crowdsourced dashboard, the method 600 may proceed to post the data visualization the user wants to delete to a voting lounge for voting on the deletion, at 640 (discussed below). In accordance with some embodiments, in addition to or instead of deleting a data visualization from a crowdsourced dashboard, the user may intend to delete a data visualization from a personalized dashboard. In such a case, the method 600 may proceed to delete the selected data visualization from the personalized dashboard interface (step not shown), before terminating (if the user does not intend to delete a data visualization from the crowdsourced dashboard) or continuing to 640.

If at 610 it is determined that the user's intended operation is to add a new data visualization to the personalized dashboard or the crowdsourced dashboard, the method 600 may proceed to generate a new data visualization personalized for the user, at 615, and then display the new data visualization to the user via the interface, at 620. If at 610 it is determined that the user's intended operation is to modify an existing data visualization on the user's personalized dashboard or on the crowdsourced dashboard, the method 600 may proceed to generate the modified data visualization personalized for the user, at 625, and then display the modified data visualization to the user via the interface, at 630. In accordance with some embodiments, the method 600 may comprise applying the new or modified data visualization to the user's personalized dashboard (step not shown) (e.g., based on user feedback following the display of the new or modified data visualization). The method 600 may further comprise determining whether the user wants to include the new (from 615, 630) or modified (from 625, 630) data visualization in a crowdsourced dashboard, at 635. If not, the method 600 ends.

Otherwise, the method 600 may comprise posting the data visualization of interest for the intended operation to a voting lounge for voting, at 640. For example, if the user's intended operation is to add the data visualization to the crowdsourced dashboard, modify the data visualization on the crowdsourced dashboard, or delete a data visualization from the crowdsourced dashboard (as determined at 610), the data visualization of interest (the new or modified data visualization or an existing data visualization to be deleted) is posted to the voting lounge so that other users may vote on whether to complete the user's intended operation.

In accordance with some embodiments, a dashboard system may receive, via a voting lounge, indications of votes from one or more other users via any of various types and combinations of user devices. For example, a user in a data ecosystem may actuate a button or other interface element to indicate a "Yes" or "No" vote to complete an indicated operation (e.g., an add, modify, or delete operation for a data visualization). It will be readily understood that any of various types of voting schemes may be used in accordance with a desired implementation. In one example, an intended operation may require at least a threshold number of votes in order to complete the operation. In another example, each particular type of intended operation (e.g., add, update, delete, etc.) may be associated with a respective number of minimum votes ($n_{add}$, $n_{update}$, $n_{delete}$) that is required to complete that type of operation, where $n_{add}$ is the minimum threshold number of votes required for addition of a data visualization in the crowdsourced dashboard;

$n_{update}$ is the minimum threshold number of votes required for updating a data visualization in the crowdsourced dashboard; and $n_{delete}$ is the minimum threshold number of votes required for deletion of a data visualization in the crowdsourced dashboard.

It will be readily understood that a minimum threshold number of votes predetermined for a given type of operation may differ from or may be the same as one or more other minimum threshold numbers for other operations.

In another example, a minimum threshold number based on a percentage of voting users and/or of users eligible to vote may be used as a voting threshold (e.g., 65% of eligible voters must vote in support of a deletion operation; 40% of voters must vote to add a new data visualization).

Referring again to FIG. 6, the method 600 may further comprise determining whether the required number of votes was received to perform the user's intended operation, at 645. As noted above, this determination may comprise receiving one or more votes from users in a data ecosystem, identifying a corresponding minimum threshold number of votes required for the intended operation (e.g., $n_{update}$ for an update operation on the crowdsourced dashboard) and determining whether the number votes received that are in favor of the intended operation is equal to or greater than the minimum threshold number.

If the votes received via the voting lounge included a number of votes in favor of the intended operation that was equal to or greater than the minimum threshold number of votes required for that operation, the method 600 may comprise proceeding to execute the desired operation ("YES:ADD," "YES:MODIFY," or "YES:DELETE"); otherwise ("NO"), the method 600 terminates without completing the user's intended operation.

For example, if the intended operation (determined at 610) was to add a new data visualization to the crowdsourced dashboard and at least a minimum threshold number $n_{add}$ of approval votes were received after data visualization was posted at 640, the method 600 may comprise adding the new data visualization (e.g., generated at 615) to the crowdsourced dashboard (YES:ADD) at 655.

In another example, if the intended operation was to update an existing data visualization on the crowdsourced dashboard (e.g., based on the modification generated at 625), and at least a minimum threshold number $n_{update}$ of approval votes were received, the method 600 may comprise updating the modified data visualization in the crowdsourced dashboard (YES:MODIFY), at 660. In another example, if the intended operation was to delete an existing data visualization from the crowdsourced dashboard, and at least a minimum threshold number $n_{delete}$ of votes were received approving the deletion, the method 600 may comprise updating the modified data visualization in the crowdsourced dashboard (YES:DELETE), at 650.

It will be understood that a user requesting a modification and/or deletion of a shared data visualization on the crowdsourced dashboard may be the same as or different from the user who originally presented the visualization for addition to the crowdsourced dashboard.

Any or all of methods 300 and 600, and other methods described in this disclosure, may involve one or more interface(s), and the methods may include, in some embodiments, providing an interface through which a user may (i) submit data query requests, (ii) post a data visualization to a crowdsourced dashboard, and/or (iii) request additions, deletions, and/or modifications to one or more shared dashboards/crowdsourced dashboards in one or more ecosystems.

Figure 7:
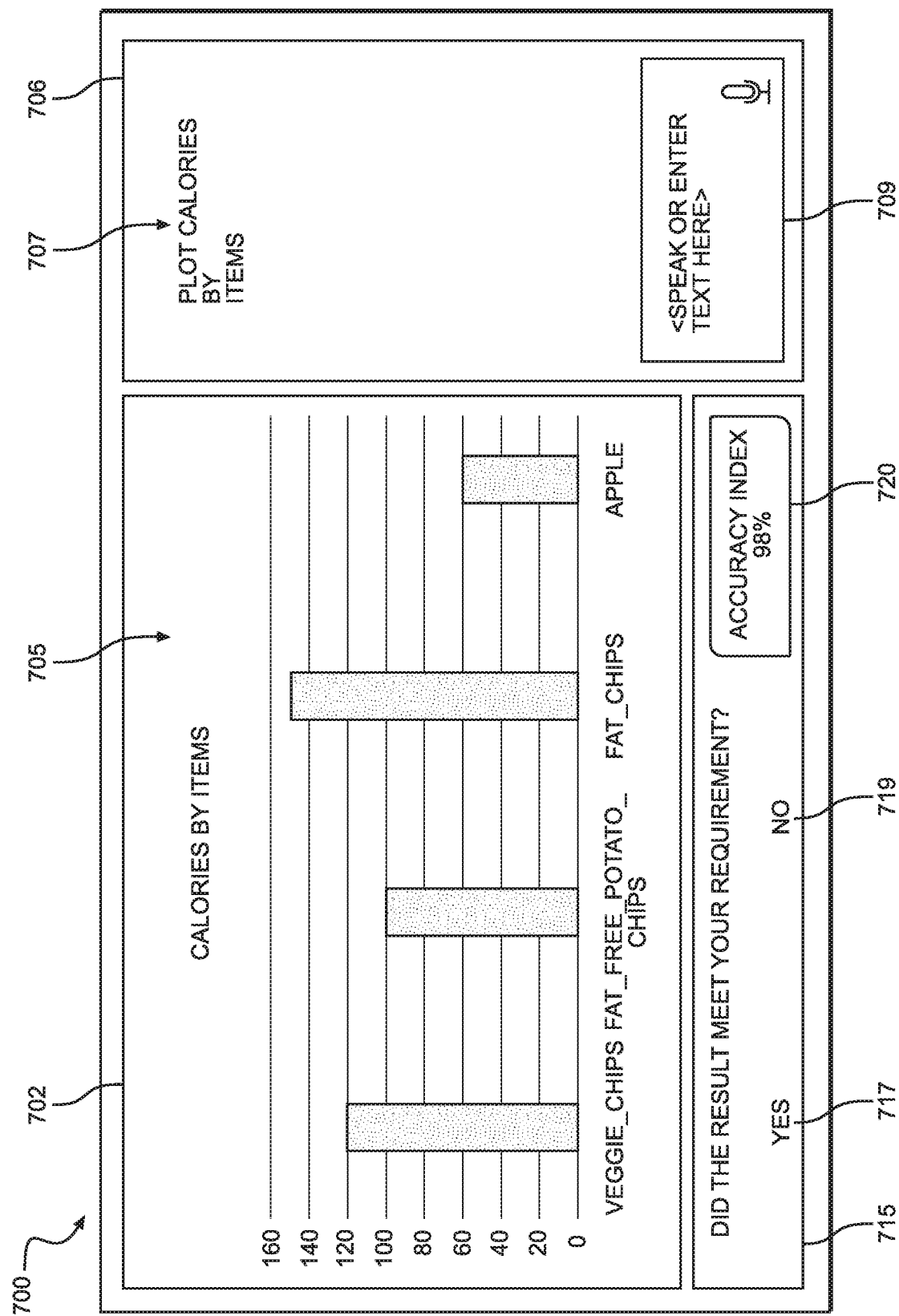
FIG. 7 is an example data visualization interface according to one or more embodiments.

FIG. 7 illustrates an example personalized dashboard interface 700 showing a data visualization 702 including a bar chart 705 of data query results based on a natural language text user input 707. The user input interface portion 706 comprises an indication of the natural language text user input 707 and a user input area 709 for the user to input search requests using text and/or audio. The dashboard interface 700 further comprises a feedback interface portion 715 including interface inputs 717 and 719 for the user to indicate whether the user approves of the data search results depicted in the data visualization 702 and/or the bar chart 705. The example accuracy index 720 provides an indication from the dashboard system of how accurately the presentations of data visualizations have been (e.g., to this user and/or to multiple users) based on user feedback presented via the feedback interface portion 715.

Figure 8:
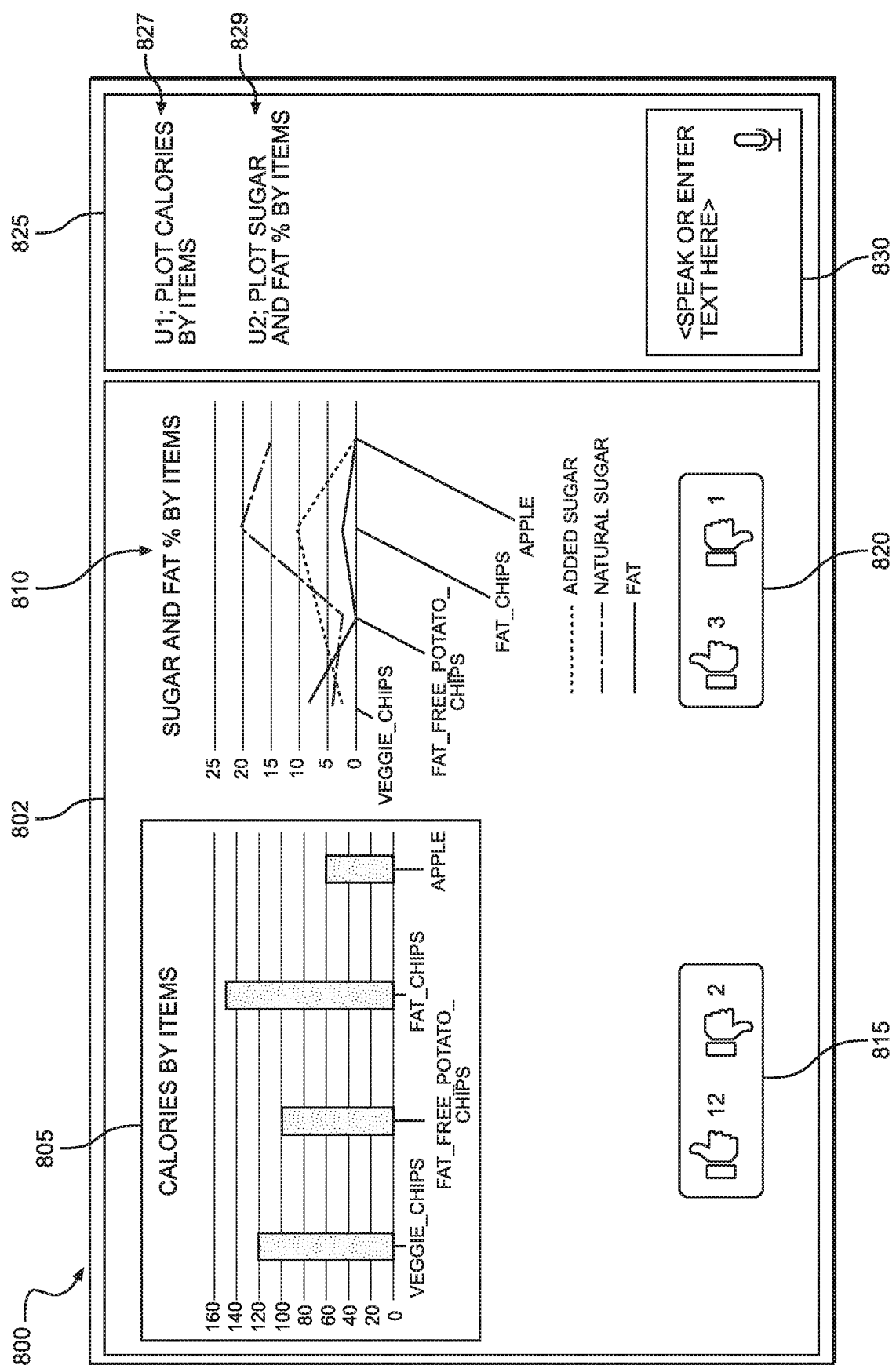
FIG. 8 is an example data visualization interface according to one or more embodiments.

FIG. 8 illustrates an example shared or crowdsourced dashboard interface 800 showing a shared visualization space 802 including shared data visualizations 805 and 810 (an example shared bar chart (805) and an example shared line chart (810)). The shared visualization space 802 further includes, for each of the shared data visualizations 805 and 810, indications of voting history 815 and 820, respectively. Similar to the personalized dashboards, the user input interface portion 825 comprises an indication of natural language text user inputs 827 and 829, and a user input area 830 for a user to input search requests using text and/or audio.

The following describes an example implementation of a dynamic data dashboard system providing an SQL data query generation and data visualization tool capable of accepting and processing natural language text from a user. While reference is made for the purpose of illustration to particular data subject matter, modules, visualizations, database corpuses, use cases, and the like, it will be understood by those skilled in the art that in light of the present disclosure, various types of modifications may be made to the described examples that are consistent with the breadth of the embodiments described in this disclosure as a whole. The features of the examples are not limiting to the scope of the invention unless explicitly provided for in the claims of this application.

The example system includes five modules, although more or fewer may be desirable for a given implementation. In one embodiment, the modules are prepared before execution of the tool by users. In some embodiments, the modules may be updated with (1) each new table addition to the corpus and/or (2) each execution of a user query. Some example steps for the creation and updating of the various types of modules are explained in detail below with reference to different examples.

According to the example, the system includes the following modules: database corpus, visualization analysis module, user intent module, visualization best practices module, and accuracy metrics module. The following describes some example processes for creating the modules.

A. Building the Database Corpus

The example dashboard tool may utilize a complete and regularly updated database corpus for an effective implementation. A database corpus is a collection of all data elements built from (1) data, (2) metadata of various tables, and (3) an association between two data elements from all the tables that are in scope of the data dashboard for insight discovery.

The following examples in this disclosure highlight a use case specific to the food industry; however, the use of the tool and its related functions are not limited to the information subject matter of any particular industry.

The following tables will be referred to as the data source for the use case discussed in this example: items availability table (ITEMS_AVL), item ingredients table (ITEM_IN-GREDIENTS), and store location table (STORE_LOC).

The items availability table (ITEMS_AVL) lists the item names and their corresponding availability in all the stores. For example, if an item and a store are associated with value Y in AVL column, it means that the item is available in the store. Similarly, if an item and a store are associated with value N in AVL column, it means that the item is not available in the store.
Granularity: Item, Store
Topic: Item, Store, Availability

| Item<br>ITEM | Store<br>STORE | Availability<br>AVL |
| --- | --- | --- |
| Apple | Store 1 | Y |
| Apple | Store 2 | N |
| Veggie_Chips | Store 1 | Y |
| Fat_Free_Potato_Chips | Store 1 | Y |
| Potato_Chips | Store 1 | Y |
| Vegetable_Chips | Store 2 | N |
| Fat_Free_Potato_Chips | Store 2 | Y |
| Potato_Chips | Store 2 | Y |

The item ingredients table lists the ingredients associated with each food product. The columns ADDED_SUGAR, NATURAL_SUGAR, FAT, and OTHERS represent values indicative of the percentage (%) of total ingredients.
Granularity: Item
Topic: Item, Type, Sugar, Added Sugar, Healthy, Fat, Organic, Natural, Calorie (calories per serving)

| Item<br>ITEM | Type<br>TYPE | Added Sugar<br>ADDED_<br>SUGAR | Natural Sugar<br>NATURAL_<br>SUGAR | Fat<br>FAT | Organic<br>ORGANIC | Others<br>OTHERS | Calories<br>CALORIES |
| --- | --- | --- | --- | --- | --- | --- | --- |
| Veggie_Chips | Chips | 2 | 4 | 8 | N | 86 | 120 |
| Fat_Free_Potato_Chips | Chips | 6 | 2 | 0 | Y | 92 | 100 |
| Potato_Chips | Chips | 10 | 20 | 2 | Y | 68 | 150 |
| Apple | Apple | 0 | 15 | 0 | Y | 85 | 60 |

The store location table (STORE_LOC) lists the stores along with the ZIP Codes for their locations.
Granularity: Store
Topics: Store, Zip Code

| Store<br>STORE | Zip Code<br>ZIP | Inside City<br>IN_CITY |
| --- | --- | --- |
| Store 1 | 06042 | Y |
| Store 2 | 06103 | Y |

The following describes some example steps for building a database corpus for a dashboard system based on the tables described above. First, find all the tables in the scope of the insights discovery by the dashboard. In this instance, the tables are: ITEMS_AVL, ITEM_INGREDIENTS and STORE_LOC. The next steps describe how the database corpus is created or updated with data, metadata, and semantic information from each table in the corpus. The corpus variables can be stored, for example, in JSON format.

Second, build a table semantics dataset (TBL_SEMAN-TICS). For instance, the following elements should be captured for each table:
Data granularity and the topics for which the table should be accessed; and
All the tables the table can join to, along with the information on keys.

For example, each table should have an entry in TBL_SE-MANTICS as follows:
table_1: [domains: [domain1, domain2, . . . ],
  joins: [table2:[column1]]
The following is an example of an entry for the ITEMS_AVL table:
TBL_SEMANTICS=[
  ITEMS_AVL: [granularity: [{Item, Store}],
    topics: [Item, Store, Availability],
    joins: [ITEM_INGREDIENTS:[ITEM], STORE_LOC: [STORE]]
]

Third, an element list (ELEMENTS_LIST) should be built. In one embodiment, all the elements from all the columns are captured (except the columns with high cardinality) in tables to form the elements list. Removing the high cardinality fields make sure that the sequence and key fields are not part of the elements list. If an element is made of multiple words or a single word separated by a delimiter (e.g., "_"), an entry is created that includes all words together. As the example tool uses a lookup method that has higher confidence on first matches rather than the later ones, the element lists should be arranged in the decreasing order of word fragments separated by the delimiter. As a result, the elements with more word fragments are searched earlier than the elements with fewer word fragments.

In this example, if there are values repeating in multiple columns, then column_value will be mentioned as an element. For example, "Y" and "N" values are in AVL and IN_CITY columns, whereas AVAILABLE will map only to "Y" value in AVL column.

For example, ELEMENTS_LIST will have an entry in the following format:
ELEMENTS_LIST:
{
  two: [two_word_elements: [word1 word2, word1a word 2a, . . . ]]
  one: [one_word_element: [word1, word1a, . . . ]],
}
The following is an example of an entry for the ELEMENTS_LIST information:
{
  two: [Veggie_Chips: [Veggie Chips, Veggie Chip],
    Potato_Chips: [Potato Chips, Potato Chip]],
  one: [Apple: [Apple, Apples],
    Chips: [Chips, Chip],
    Store: [Store, Stores],
    AVL_Y: [Available, Availability],
    AVL_N: [Unavailable, Non-Availability],
    AVL_IN_CITY: [In City, City]]

In a fourth step for building the database corpus, a columns list is built (COLUMNS_LIST). The purpose of this list is to capture all known terms with which users may denote the fields in tables. In one example, each item in the columns list may be stored in the following format. In this example, the information stored indicates that a given column ("column1") may be referred to as "term1a" or "term2a" by the users.

COLUMNS_LIST: {Column1: [Term1a, Term2a, . . . ]}

The following is an example of a columns list for table ITEMS_AVL:

COLUMNS_LIST: {
  ITEM: [ITEM, FOOD],
  STORE: [STORE, SHOP],
  AVL: [AVL_Y, AVL_N],
  TYPE: [CHIPS, APPLE],
  ADDED_SUGAR: [ADDED SUGAR, SWEET],
  NATURAL_SUGAR: [NATURAL SUGAR],
  FAT: [FAT, CHOLESTEROL, FAT FREE],
  ORGANIC: [ORGANIC, NON GMO, NON-GMO, NATURAL],
  CALORIES: [CALORIES],
  ZIP: [ZIP, ZIPCODE],
  IN_CITY: [IN_CITY_Y, IN_CITY_N]
}

In a fifth step, the columns of tables are associated with each identified element. In this example, the mapping information is referred to as ASSOC_ELEMENTS_COLUMNS. All elements are mapped to the column names where they belong. It is advisable to include only the columns with low cardinality for the association and to leave out the columns with high cardinality (e.g., key columns). In one example, information associated with each column may be stored in the following format:

ASSOC_ELEMENTS_COLUMNS:
{
column_name1: [element1a, element1b, element1c]
}

The following is an example of an association of the columns for the database corpus with the corresponding data elements:

ASSOC_ELEMENTS_COLUMNS:
{
  ITEM: [APPLE, VEGGIE_CHIPS, POTATO_CHIPS, FAT_FREE_POTATO_CHIPS]
  STORE: [STORE_1, STORE_2]
  AVL: [Y, N]
  TYPE: [CHIPS, APPLE]
  . . .
  . . .
}

In a sixth step for establishing the database corpus, the columns are associated with the corresponding tables (ASSOC_COLUMNS_TABLES). All columns are mapped to all tables in which they appear. For example:

ASSOC_COLUMNS_TABLES:
{
table_name1: [column1a, column1b]
}

The following is an example of an association of the columns for the database corpus with the corresponding tables:

ASSOC_COLUMNS_TABLES:
  {ITEMS_AVL: [ITEM, STORE, AVL]
  . . .
  . . .
}

In a seventh step, a collection (SQL_ENG_WORDS) is built of all English words that have rich meaning in SQL context. It will be readily understood that words other spoken languages and combinations of spoken languages may be used as desired. There are many keywords in SQL that may have rich meaning from a query perspective but may be considered as a stopword in the English language. For example, a term "AND" may be used to describe plurality in SQL context; however, "AND" may be considered a stopword in many stopwords lists of common natural language processing (NLP) libraries (e.g., Stanford NLTK NLP Library Stopwords List3). The following is an example of a SQL_ENG_WORDS collection:

SQL_ENG_WORDS: {AND, OR, LIKE, HAVING, SELECT}

In an eighth step, a list of SQL stopwords (stopwords from an SQL perspective) may be built to be used for pre-processing (SQL_STOPWORDS). In one embodiment, building this list may comprise starting with an English stopwords list and removing all the words in the SQL_ENG_ WORDS collection built in the previous step. This will ensure that words having a rich meaning in SQL context will not be removed in a pre-processing step for user input. For example, the SQL_STOPWORDS collection should not contain the words "AND" or "OR."

In a ninth step, the database corpus (DATABASE_CORPUS) should be built from all the words appearing in all the collections established as described above (with the exception of the SQL_STOPWORDS collection). In one embodiment, the database corpus is established with the following collections:

TBL_SEMANTICS,
ELEMENTS_LIST,
COLUMNS_LIST
ASSOC_ELEMENTS_COLUMNS,
ASSOC_COLUMNS_TABLES, and
SQL_ENG_WORDS.

The purpose of building the database corpus is to have a complete list of all the words that may directly or indirectly refer to data elements in the scope of the dynamic data dashboard in order to facilitate natural language processing and suggestion of data elements for unmatched words, where appropriate.

As noted above, SQL_STOPWORDS list is not included in the example database corpus because that list includes the list of words that probably do not have significant meaning in an SQL context, and should be removed before interpreting the user input.

B. Building the Visualization Analysis Module

The example SQL data query generation and data visualization tool uses a visualization analysis module to determine the high-level objective of user statements. For example, the tool can determine the format of final output (e.g., text, plot, and/or grid) by leveraging this module. To establish the visualization analysis module, various data representation formats are mapped with all terms that users may provide. An example of this visualization listing (INT_ANL_OUT_FORMAT) follows:

INT_ANL_OUT_FORMAT:
  grid: [grid, table, result]
  graph: [plot, graph]
  text: [what, where, find, list, how_many]
}

Alternatively, or in addition, a data collection may be defined to determine more granular information on output format, such as a specific type of line graph. For example:

graph_kind:
  line: [line, time-series, time]
  bar:[bar]
}

Next, a list may be built of all aggregation methods in association with words users may use to refer to them (INT_ANL_AGGR). In one example:

INT_ANL_AGGR
{
min: [min, minimum],
max: [max, maximum],
count: [total, count, how_many]
sum: [sum, aggregate]
}

C. Building the User Intent Module

According to this example implementation of a dynamic data dashboard tool, a user intent module iteratively builds a collection that signifies how different people may use the same words differently. For each word in the database corpus, the user intent module captures the following:

All words users might input to indicate respective elements in the database corpus.

Personalized input (e.g., for a specific user) as well as how a plurality (e.g., a majority) of the users indicate the data element.

In one example format, the terms used to indicate a particular element ("element1") may be listed as follows:

element1:
{
term1:
{
users: [(u1, f1, % p1), u2, f2, % p2]
global: (f all,% p_all)
}
} where element1: An element in database or condition.
term1: One of the terms by which users indicate element1. In this example, both users u1 and u2 use the term.
users: The list of user, term frequency and term percent combination.
global: Total frequency and percentage of times term1 meant element1 for all users.

In some embodiments, the frequency elements may be capped at a high limit suggesting the highest utilization to be recorded by the dynamic data dashboard system. For example, the tracked frequency of elements may be limited to a highest value of 999.

The following provides an example of a collection built by the user intent module for terms used by users to indicate food products that have no fat content:

FAT=0:
{
FAT FREE:
{
users: [(u1,3,0.4), (u2,2,0.1)],
global: (10,0.3)
}
HEALTHY:
{
users: [(u3,3,0.6), (u4,2,0.3)],
global: (10,0.7)
}
}

The user intent module may provide one or more functions, including but not limited to:

a) Identifying new terms: When a user mentions a term for the first time and the term does not correspond to any elements or may correspond to one or more of multiple elements in the element list, the user may be asked for feedback. This feedback can be taken from the term-to-element association having the highest global frequency and percentage metrics because that represents how the user might want to use the new column.

b) Seeking personalized feedback: When a new user enters a term, the module can identify how the users in his or her organization use the word and seek personalized feedback/confirmation from the user.

c) Once the user input is converted to a query and the user indicates the user is satisfied with analysis (Feedback: YES), the user intent module may be updated with entries corresponding to the new user. Both user metrics and global metrics may be updated to include insights from data query executions.

D. Building the Best Visualization Practices Module

A best visualization practices module may be used in some implementations to capture user preferences for visualizing data elements. If a sizeable number of users prefer to visualize a data element in a specific way, the specific visualization may be identified as a favorite or a best practice for visualizing that data element. In one example, visualization best practices involving columns col_1 and col_2 may be represented as in the following example. Note that the example format also captures information on all users who used the visualization and the total execution count in a global section.

col_1: [viz_type: [col2, users: [(u1,f1), . . . ], global: (f_all)]]

In one example, a user ("u1") prefers to view a bar graph of calories by item. This preferred visualization may be represented as follows:

CALORIES: [BAR: [ITEM, users: [(u1,1)], global: 1]]

As more and more people use a specific visualization, it may be identified as a best practice. When a new user tries to visualize the data elements, he/she may get a recommendation for one or more visualizations based on the associated best visualization practice for those data elements.

E. Building the Accuracy Metrics Module

After a particular visualization is presented to a user (e.g., after generation of an SQL data query based on user intent, and selection of a data visualization, as discussed above), the data visualization tool seeks input indicating user satisfaction with the data visualization. In one embodiment, the feedback is provided in the form of a YES/NO response. Based on the response, the tool builds and/or updates the accuracy metrics associated with the presented data visualization. Accordingly, the accuracy metric comprises a user-centric metric demonstrating how well the tool has been performing, overall and with respect to each user, at presenting meaningful and appropriate data visualizations. These accuracy metrics help in evaluating whether the tool is performing optimally and may suggest that additional training and user interactions are required. In one embodiment, accuracy metrics are updated after every data query execution.

In some embodiments the accuracy metric may be defined as follows:

ANL_ACCR_METRIC={All: (Count of Satisfied Analysis, PCT of Total),
U1: (Count of Satisfied Analysis, PCT of Total)} where

Count of Satisfied Analysis: The number of times users were satisfied with the analysis.
PCT of Total: % of times users were satisfied with analysis.
Each of the above two metrics may be calculated for (i) each individual user and (ii) overall for all users.

F. Example Data Visualization Tool Functions

A detailed description of the functionality of an example data visualization tool are provided below. Five non-limiting example use cases are then described to illustrate different aspects of how the tool operates.

1. Accepting and Converting User Input

The example tool allows users to interact with it in text and/or voice form. For example, a user may interact with the tool using an input section of a user interface (e.g., an "<Enter Voice OR Text Here>" interface portion, as shown in FIG. 7). Input (e.g., a description of a desired data query) may be received in text form. If the user input is received as audio input, the input is converted to text. Should the user prefer to interact with the tool by speech, they can click on a microphone icon and speak. In one example, the tool uses one or more speech recognition engines and/or APIs (e.g., Google™ Speech API) to convert the audio of spoken sentences to text format for further processing.

2. Preprocess the Text in Advance of Meaning Derivation

As a next step, the user input (in natural language text form) is transformed in a preprocessing function that makes sure that all words of the natural language text have been converted to base lemmas. This preprocessing may comprise one or more of: lowercasing, tokenization, part of speech analysis, and/or lemmatization.

3. Database Corpus Lookup

After preprocessing of the natural language text is completed, all words identified in the preprocessed text are compared to the SQL_STOPWORDS list. When there is a match, the word is may be removed from the natural language text, as it is unlikely to have rich meaning for purposes of data query generation and insight. The words from the preprocessed text are also compared with the terms in the database corpus to analyze the interaction and derive meaning from the text corresponding to the user's input.

According to some embodiments, if a match is found in the database corpus, the match is identified, and no further action is needed. If, however, a term of the preprocessed text does not match with any item in the database corpus, the tool can seek feedback from the user regarding his or her intention. In some embodiments, the request for feedback may comprise providing to the user one or more personalized suggestions and/or asking directly how the term should be mapped to data of interest. The tool can provide personalized suggestions because it has access, in the database corpus, to the conversation mapping of other users (e.g., users within same organization, etc.).

When a user phrase does not have a match with the database corpus, the tool seeks user input to proceed with the search hierarchy described in the following table to identify a likely match. The table provides a listing of potential user responses to a request for feedback, and corresponding actions that may be taken by the tool (e.g., based on the execution of software instructions).

| User Response/Scenario | Tool Actions |
| --- | --- |
| Word is a stopword | The word is added to stopwords list of database corpus. |
| User maps word to another element in database corpus. | The lineage for the matched element in database corpus is identified. |
| Word is a visualization type | The new visualization type is added to visualization analysis module. |
| No match in the database corpus of the current data ecosystem | Tool proceeds with search of the word in database corpus of other data ecosystems. |
| No match in current data ecosystem, but match found in other data ecosystems. | Fetches the lineage (table, column, elements) from the other database ecosystem and asks user whether the data can be used. If user confirms, the query generation process proceeds in the personalized dashboard. Database Corpus Update After the query execution is completed, the user is asked whether he/she would like to include the data to the database corpus of the current ecosystem. If user indicates approval, the column/data addition requests are sent to the voting lounge for voting. If the data addition request receives positive votes higher than a threshold, the database corpus of the current ecosystem is updated. |
| No match in any data ecosys tem(s) | Fetches the lineage (table, column, elements) from the other database ecosystem and asks user whether the data can be used. If user confirms, the query generation process proceeds in the personalized dashboard. Database Corpus Update After the query execution is completed, the user is asked whether he/she would like to include the data to the database corpus of the current ecosystem. If user indicates approval, the column/data addition requests are sent to the voting lounge for voting. If the data addition request receives positive votes higher than a threshold, the database corpus of the current ecosystem is updated. |

The final output of this stage is a query builder collection that includes necessary and sufficient information to form the SQL data query corresponding to the user's query request. One example of a query builder follows:

```
QUERY_BUILDER:
{
  INT_ANL_OUT_FORMAT: text,
  INT_ANL_AGGR: count,
  TIME_FORMAT: None,
  COLS=None,
  AGG_COLS=[ITEM_INGREDIENTS.CALORIES],
  TABLE: [ITEM_INGREDIENTS]
  FILTER: [(ITEM_INGREDIENTS.FAT: 0), . . . ]
}
```

4. Data Query Formation, Execution, and Display of Results on Dashboard

Next, the final SQL query is formed from the query builder elements and executed, as will be readily understood from the present disclosure by those skilled in the art. The final results are displayed on the user's personalized dashboard.

5. Collect and Act on User Feedback

After the data visualization is presented to a user, the tool may seek feedback from the user on whether the presented visualization met the user's expectations. In response to the received feedback, the tool may update accuracy metrics and/or core modules for the tool.

For example, if the user's feedback indicates that the presented visualization met expectations (e.g., a "YES" button is selected), the core modules should be updated as follows:

Database corpus: All the words in user input and their association to the data elements should be added to the database corpus if they did not already exist.

Visualization analysis: If the user query included any new words to describe the kind of analysis, add the new words to one or more of the collections related to visualization analysis (e.g., INT_ANL_OUT_FORMAT, INT_ANL_AGGR).

User intent: If the user employed any new words to refer to database elements, the corresponding user intent collections for the user and all users should be updated.

Visualization best practices: If the analysis was completed as per previously-noted best practices for the metric, the practice should be upvoted. If the analysis included a new method to analyze the metric, the method should be added to the best practice collections related to the element or metric.

Update the accuracy metric to reflect the performance of the tool.

In another example, if the user's feedback indicates that the presented visualization did met expectations (e.g., a "NO" button is selected), no update is required to the database corpus, visualization analysis, and user intent core modules. If the analysis was completed as per previously-noted best practices for the metric, the practice should be downvoted. The accuracy metric should also be updated to reflect the performance of the tool.

G. Example Data Insights

The example tool may be used, in accordance with one or more embodiments, to derive a variety of data insights. Example categories of insights include, but are not limited to: assisted data exploration, personalized insights, and collective insight through crowdsourced dashboards. Several example use cases and scenarios are described in detail below to demonstrate the tool's usefulness and technical advantages for different categories of data analysis.

1. Category 1: Assisted Data Exploration

1.1. Example 1: All User Phrases are Available in Database Corpus

Example 1 demonstrates how the tool makes sense of user input when the user mentions the most frequently used words found in the database corpus. Accordingly, for the sake of simplicity this example demonstrates the working operation of the example tool considering only: (1) the database corpus, (2) the interaction module, and (3) the accuracy metrics. However, all the modules may be employed together during an actual data query execution.

According to this Example 1, a user is interested to find the stores that have apples available. The user creates a voice input: "List the stores that have apples available." The following steps describe some of the processing performed by the tool in response to the user's voiced request in this Example 1.

Step 1: Accept the user input. If the user input is not in text form, convert it to text.
User input (in speech): "List the stores that have apples available"
The user input is converted to text and the output from step 1 is as follows:
Output (text): "List the stores that have apples available"

Step 2: Preprocess the text and make it ready for derivation of meaning. The output from Step 1 is put through lowercasing, lemmatization, and stopwords removal as per the SQL_STOPWORDS list. Accordingly, all the letters are converted to small alphabet characters and the stopword "the" is removed. As a result, the output from Step 2 is: list store apples available.

Step 3: Perform database corpus lookup. In this step, the tool goes through each word in the preprocessed text and tries to find a match with the database corpus and the visualization analysis modules.

In the case of element search (ELEMENTS_LIST), when there is a match of an element, the tool looks for bi-grams, tri-grams or tetragrams to determine whether it is a multi-word element. In this example, the tool will find a match for the term "store" in the element list. Any further attempt to match the bi-gram "store apple" will not result in a match.

In this Example 1, there is no time-related formatting required. Accordingly:
time_format: None
Next, the tool tries to derive the output format and aggregation type using the visualization analysis module. The following discoveries are made from the below words:
list→INT_ANL_OUT_FORMAT: grid
none→INT_ANL_AGGR: none
As a result, the intermediate query builder collection may look as follows: query_builder:
{
INT_ANL_OUT_FORMAT: grid,
INT_ANL_AGGR: None
TIME FORMAT: None
}
Next, the elements, columns, and the tables are looked up in that order to identify the lineage of words from the user input. The lineage in a list form (element, column, tables_list) may be described as follows:
store=[STORE, STORE, [ITEMS_AVL, STORE_LOC]]
apple=[APPLE, ITEM, [ITEMS_AVL, ITEM_INGREDIENTS]]
available=[Y_AVL, AVL, [ITEMS_AVL]]

The tool may then be configured to attempt to find the information on tables, columns, aggregated columns, and filter information by employing regular expression. The table can be derived from the lineage of all words derived above. If a common table appears in the lineage of all the words, then an SQL join is not necessary. Otherwise, if multiple tables are involved, the appropriate join criteria may be discovered from TBL_SEMANTICS in the database corpus.

In one example, an aggregation column can be in the form:
<column_name> <aggregation type>
Or
<aggregation type> of <column_name>.
A filter column or element is may be mentioned in queries after the words: of, for or in. Accordingly, in this example, the tool determines that the word "available" in the user's input should be classified as a filter. This information may be represented, for example, as:
Filters:
{
ITEMS_AVL.AVL=Y
}
Assembling the pieces of information derived from the database corpus lookup, the final query builder collection for this Example 1 may look as follows:
query_builder:
{
INT_ANL_OUT_FORMAT: grid,
INT_ANL_AGG: None,
TIME_FORMAT: None, COLS=STORE,
AGG_COLS=None,
TABLE: [ITEMS_AVL]
FILTERS:
[ITEMS_AVL.AVL=Y]
}

Step 4: Query formation, execution, and display of results on dashboard. In Step 4, the tool defines and executes the data query based on the query builder collection. The data query may be defined as follows based on the information in the query builder collection:
SELECT
STORE
FROM ITEMS_AVL
WHERE ITEMS_AVL.AVL='Y'

Then, the tool executes the data query displays the final output to the user in a grid format as the user requested.

Step 5: Collect user feedback and update the accuracy metrics and core modules. In this Example 1, the user indicates satisfaction with the analysis. Accordingly, the following actions are taken by the tool:
a) Any new words in in the user conversation not already in the database corpus are added to the corpus.
b) There were no new words in user conversation to describe the kind of analysis or user intent. Accordingly, the update of visualization analysis module or user intent module was not required.
c) As the visualization or representation of output was new, it was added to the visualization best practices module.
VIZ_BEST_PRACTICES: {
grid: [{Store}]
d) The accuracy metric was updated to reflect that the user was satisfied with the analysis.

In one example of how the accuracy metric may be updated, if before the analysis the accuracy metrics were:
ANL_ACCR_METRIC={All: (60,0.75), U1: (5, 0.5), ... }
then after the analysis, the metrics may be modified as follows
ANL_ACCR_METRIC={All: (61,0.76), U1: (6, 0.55), ... }.

Thus, the total query execution count and accuracy percentage are updated both at the user level ("U1") and the global level ("All").

1.2. Example 2: All User Phrases are not Available in Database Corpus; External Data Needed for Insights Generation Example 2 demonstrates an example scenario in which the dashboard tool does not find any user phrases in the database corpus and the option of fetching external data is suggested and/or reviewed. As change to the database table structures may be necessary, the change request is put to a voting lounge for the ecosystem for voting. After getting positive votes higher than a predetermined threshold (e.g., five or more; 50% of all ecosystem users), the database update takes place followed by the update of the database corpus.

In this Example 2, the user is interested in finding the fat and the sodium percentage for chips. The user inputs: "Plot the fat and sodium percentage for the chips." As in Example 1, the user input is converted to text if not initially in text form and preprocessed to ready it for deriving the user's intent. The tool then similarly goes through each word in the preprocessed text and tries to find match with the database corpus and the visualization analysis modules.

For Example 2, the intermediate query builder collection may look as follows:
query_builder:
{
INT_ANL_OUT_FORMAT: grid,
INT_ANL_AGGR: None
TIME FORMAT: None
}

Then, the elements, columns, and the tables are looked up in that order to identify the lineage of words from user input. The lineage for all the words can be found for Example 2, except "sodium," which is not in database corpus. The lineage of the words so far may be represented as:
fat=[FAT, ITEM_INGREDIENTS]
chips=[CHIPS, CATEGORY, ITEM_INGREDIENTS]

As there is no match for the word "sodium" in the example database corpus, the dynamic data dashboard tool will request information form the user to derive the intent of the user input. One example search hierarchy, as described above in the table of User Response/Scenarios and corresponding Tool Actions, would result in the following series of determinations made by the tool based on example responses from the user:
Is it a Stopword—No.
Can the word be mapped to other words in the database corpus—No.
Does the word represent a visualization type—No.
No match in database corpus of current ecosystem—Yes [This initiates a search for the word in other ecosystems].
Match found in another ecosystem—Yes. [In this example, Ecosystem 2 (related to health) had a table on item nutrition with the following columns: item, sodium, carbohydrates].
The user may be asked information on the item nutrition table, in order to facilitate joining that information to augment the current ecosystem.

Following the execution of this example search hierarchy, the lineage search process proceeds with the personalized dashboard for other items. At this point the lineage of all words may be represented as:
fat=[FAT, ITEM_INGREDIENTS]
chips=[CHIPS, CATEGORY, ITEM_INGREDIENTS]
chips=[chips, ITEM, ITEM_INGREDIENTS]
sodium=[SODIUM, ITEMS_NUTRITION @ ECO2]
Granularity of ITEMS_NUTRITION: ITEM
Join Criteria: ITEM_INGREDIENTS: [ITEMS_NUTRITION@ECO2, ITEM]

In the example representation of word lineage above, the lineage of the word "sodium" is mapped, in accordance with the user's responses described in the example exchange with the tool interface, by referring to the identified column and table in Ecosystem 2 (column "SODIUM" in table "ITEMS_NUTRITION @ ECO2").

After the tool finds the information on tables, columns, aggregated columns, and filter information by employing regular expression, as discussed in Example 1, the final query builder collection may look as follows:
query_builder:
{
INT_ANL_OUT_FORMAT: graph, line
INT_ANL_AGG: None
TIME_FORMAT: None,
COLS=FAT, SODIUM,
AGG_COLS=None, TABLE: [ITEM_INGREDIENTS, ITEMS_NUTRITION@ECO2]
FILTERS:
[ITEM_INGREDIENTS.TYPE=CHIPS]
}.

The resulting data query built from the query builder collection may be described as follows:
SELECT
ITEM, FAT, SODIUM
FROM ITEM_INGREDIENTS
JOIN ITEMS_NUTRITION@ECO2
ON (ITEM_INGREDIENTS.ITEM=ITEMS_ NUTRITION@ECO2.ITEM)
WHERE ITEM_INGREDIENTS.TYPE=CHIPS.

Then, as in Example 1, the data query may be executed and the final output presented to the user. In this Example 2, the visualization output comprises a line chart plotting fat and sodium percentages for each type of chips in the database corpus.

In the scenario of Example 2, the user is asked whether she would like to include the data additions to the database corpus. The user responds, "Yes," and the request is sent to the voting lounge for review. If the request gathers positive reviews higher than a predetermined threshold, the column SODIUM will be added to ITEM_INGREDIENTS table. In addition to a binary Yes/No vote, users may provide additional information and suggestions via the voting lounge review process. For instance, a reviewing user may note that the OTHERS column in ITEM INGREDIENTS will also need modification after the SODIUM column is joined in. Accordingly, the current definition of OTHERS=100−(ADDED_SUGAR+NATURAL_SUGAR+FAT) may be modified to be OTHERS=100−(ADDED_SUGAR+NATURAL_SUGAR+FAT+SODIUM) if enough positive reviews are received for this suggested change.

Specifically, the updates to the database corpus after the change is approved by the users of the voting lounge may comprise adding "sodium" as a topic item in TBL_SEMANTICS; adding a "SODIUM:[Sodium]]" entry in ELEMENTS_LIST and the COLUMNS_LIST collections; and adding "SODIUM" in the list of columns associated with the ITEM_INGREDIENTS table ASSOC_COLUMNS_TABLES.

2. Category 2: Personalized Insights

2.1. Example 3: Few Words not Available in Database Corpus; Words Related to User Context in Phrases Example 3 demonstrates how the example tool may be configured to respond to a user query by understanding the personalized context of the user. In this Example 3, a few of the words mentioned by the user are not in the database corpus and the tool requests clarification from the user to gain an understanding on these words and to include them to the database corpus as appropriate. As discussed with respect to various embodiments in this disclosure, the tool's ability to identify personalized meaning in user interactions enables it to deliver personalized insights. As outlined in this Example 3, in accordance with some embodiments, a dynamic data dashboard tool may identify personalized meaning using a user intent module.

The example use case of Example 3 involves a user requesting: "How many types of chips are available near me?" In this use case, the user is interested to know how many different types of chips are available near him or her. As the words "near me" are not in the database corpus when the user makes the inquiry, the tool will ask the user to clarify the meaning.

For instance, after preprocessing and performing database corpus lookups, the tool determines that there is no match for "near me" and prompts the user to provide input to explain the intended meaning: "What does 'near me' mean?" In response, the user in this Example 3 enters: "ZIPCODE=06103."

Based on this response, the tool adds the lineage for the term "near me" to the other terms in the query builder:
near_me=[06103, ZIPCODE, STORE_LOC]

Accordingly, the full lineage for the data query is as follows:
type=[TYPE, CHIPS, ITEM_INGREDIENTS]
available=[Y_AVL, AVL, ITEMS_AVL]
near_me=[06103, ZIPCODE, STORE_LOC]

In this case, elements are to be fetched from different tables, JOIN will be required between the tables. The JOIN parameters are retrieved from the TBL_SEMANTICS collection. The final query builder thus may be described as follows:
{
INT_ANL_OUT_FORMAT: text,
INT_ANL_AGG: Count,
TIME_FORMAT: None,
COLS=STORE,
AGG_COLS=TYPE,
TABLE: [ITEM_INGREDIENTS, ITEMS_AVL, STORE_LOC]
FILTERS:
[STORE_LOC.ZIPCODE=06103]
}

The resulting example data query may be represented as:
SELECT
COUNT(TYPE)
FROM ITEM_INGREDIENTS
JOIN ITEMS_AVL
ON ITEM_INGREDIENTS.ITEM=ITEMS_AVL.ITEM
JOIN STORE_LOC
ON ITEMS_AVL.STORE=STORE_LOC.STORE
WHERE STORE_LOC.ZIPCODE='06103'

Executing the example query against the database corpus will result (in accordance with this Example 3 and the example data described above) in an output of "2" to indicate there are two stores in the indicated ZIP Code. Assuming the user was satisfied with the analysis, the new term, "near me" is added to the database corpus. For example, the term "near_me" is added to the ELEMENTS_LIST and COLUMNS_LIST. Further, a "near_me" item is added to the user intent module to save the user's preference and/or response for future queries. The addition to the user intent module may be represented as:
near_me:
{
06103:
{users: [u1,1,1]
Global: (1,1)
}

As the visualization or representation of output (the output count) was new, it may be added to the visualization best practices module:
VIZ_BEST_PRACTICES: {
text: [{count: type}]

Further, as discussed with respect to the other examples, the accuracy metric may be updated to reflect whether the user was satisfied with the analysis or not.

2.2. Example 4: Words have Multiple Matches in Database Corpus; User Context Required Example 4 demonstrates another scenario in which the tool tries to answer a user query by understanding the personalized context of the user. If certain words mentioned by the user have multiple matches in the element list of the database corpus, the tool attempts to derive the personalized meaning for the particular user using the user intent module.

In this case, the user asks: "What healthy chips are available near me?" "Healthy" may be ambiguous; on user may consider 0% fat is healthy, while to another user, "healthy" means the food item must be organic. In this case, the tool, using the user intent module for the requesting user ("u3"), finds that user u3 means FAT=0 when referring to "healthy." The following is a snapshot of the example user intent module for the FAT=0 condition:

FAT=0:
{
  FAT FREE:
     {users: [(u1,3,0.4), (u2,2,0.1)],
      global: (10,0.3)
     }
  HEALTHY:
     {users: [(u3,3,0.6), (u4,2,0.3)],
      global: (10,0.7)
     }
}

Accordingly, the lineage of all the words of the inquiry may be derived as follows:
healthy=[0,FAT, ITEM_INGREDIENTS]
chip=[CHIPS, TYPE, ITEM_INGREDIENTS]
available=[Y_AVL, AVL, ITEMS_AVL]
near_me=[06103, ZIPCODE, STORE_LOC]

As all the elements are fetched from different tables, JOIN will be required between the tables. The JOIN parameters will be fetched from TBL_SEMANTICS. The final query builder may be described as follows:
{
INT_ANL_OUT_FORMAT: text,
INT_ANL_AGG: None,
TIME_FORMAT: None,
COLS=ITEM,
AGG_COLS=None,
TABLE: [ITEM_INGREDIENTS, ITEMS_AVL, STORE_LOC]
FILTERS:
[STORE_LOC.ZIPCODE=06103, ITEM_INGREDIENTS.FAT=0,
ITEMS_AVL.AVL='Y']
}
and the resulting query may look as follows:
SELECT
ITEM
FROM ITEM_INGREDIENTS
JOIN ITEMS_AVL
ON ITEM_INGREDIENTS.ITEM=ITEMS_AVL.ITEM
JOIN STORE_LOC
ON ITEMS_AVL.STORE=STORE_LOC.STORE
WHERE STORE_LOC.ZIPCODE='06103' AND
ITEM_INGREDIENTS.FAT=0 AND
ITEMS_AVL.AVL='Y'

The result of the query may be presented as the following example output: "Fat Free Potato Chips." In this example scenario, the user approves the result, and the user intent module is updated to reflect the accurate matching of "healthy" with the FAT=0 element. For instance, items in the user intent module may be updated as follows:

Prior to update
FAT=0:
{
  FAT FREE:
     {users: [(u1,3,0.4), (u2,2,0.1)],
      global: (10,0.3)
     }
  HEALTHY:
     {users: [(u3,3,0.6), (u4,2,0.3)],
      global: (10,0.7)
     }
}
After update
FAT=0:
{
  FAT FREE:
     {users: [(u1,3,0.4), (u2,2,0.1)],
      global: (11,0.28)
     }
  HEALTHY:
     {users: [(u3,4,0.7), (u4,2,0.3)],
      global: (11,0.72)
     }
}

Further, as described above, the accuracy metric may be updated to reflect that the user was satisfied with the analysis.

3. Category 3: Collective Insight Through Crowdsourced Dashboards

3.1. Example 5: Crowdsourced Dashboard; User Context Necessary

Example 5 demonstrates how crowdsourced versions of the tool support collaboration by allowing multiple users to create, modify, and delete visualizations on the same interface. They may also interact with each other on the dashboard and share insights through chat and other communications channels.

For instance, after the tool proceeds through the steps from receiving user input to processing user feedback mentioned with respect to the examples above, the tool may further update the visualization best practices module with information about how users, including the most recent user, prefer to visualize certain elements. For instance, if users like to plot food items with respect to the amount of added sugar in them, the following elements may be added to the visualization best practices module:
ITEM: [bar: [ADDED_SUGAR, users: [(u1,1), (u2,2)], global: 3]].

If a user wishes to display the visualization in the crowdsourced dashboard, the visualization is copied to the voting lounge for voting. If the visualization receives positive votes higher than a predetermined threshold, the visualization is added to a crowdsourced dashboard for the ecosystem.

In one example, the voting lounge interface provides two vote buttons to the users, one for an upvote or to indicate the user approves of the visualization, and another one for a downvote or to indicate the user disapproves of the visualization. FIGS. 7 and 8 provide examples of buttons for indicating approval and disapproval.

According to some embodiments, a crowdsourced dashboard presents the visualization with the highest ratings for the ecosystem. Thus, a user may get the benefit of both having a personalized version and a crowdsourced version of a visualization available through the tool.

According to this Example 5, three users (U1, U2, and U3) are users in a data ecosystem. The ecosystem has a voting scheme that requires at least two votes (including the vote of the user who posts the visualization for voting) for any addition/modification/deletion of visualizations in the crowdsourced dashboard. The table following the legend below describes a series of interactions of users with their personalized dashboards and with the voting lounge and crowdsourced dashboard of the system, and the example steps taken by the dynamic data dashboard tool based on those interactions.

U1_P: Personalized Dashboard for user U1
U2_P: Personalized Dashboard for user U2
U3_P: Personalized Dashboard for user U3
VL: Voting Lounge
C: Crowdsourced Dashboard
Viz . . . :Visualizations

| Steps | Actions | Personalized Dashboard | Voting Lounge; Crowdsourced Dashboard |
|---|---|---|---|
| 1 | U1 Asks: Plot the chips in increasing order of Added Sugar (Viz1) | U1_P: Viz1 Added. U2_P: Blank U3_P: Blank | VL: Viz1 Added to Voting lounge & voting requests sent to all Users C: Blank |
| 2 | U1 and U2 give +1 to Viz1. | U1_P: Viz1 U2_P: Blank U3_P: Blank | VL: Blank C: Viz1 Added (+2 Votes) |
| 3 | U3 asks: What is healthy? (Viz2) Healthy for U3 means FAT = 0 | U1_P: Vizi U2_P: Blank U3_P: Viz2 (Apple, Fat Free Potato Chip) | VL: Viz2 Added to Voting lounge & voting requests sent to all Users. C: Viz1 (+2) |
| 4 | U1, U2, U3 give +1 to Viz2. For U1 and U2, Healthy means Organic = Y. Hence, Crowdsourced Dashboard will present this output. | U1_P: Viz1 U2_P: Blank U3_P: Viz2 (Apple, Fat Free Potato Chip) | VL: Blank C: Viz1 (+2), Viz2 Added (+3): Organic |
| 5 | U2 Asks: Copy Viz1, Viz2 to Personalized Dashboard | U1_P: Viz1 U2_P: Viz2 (Organic), Viz1 U3_P: Viz2 (Apple, Fat Free Potato Chip) | VL: Blank C: Viz1 (+2), Viz2 (+3): Organic |
| 6 | U2 Asks: Modify Viz1 to plot the chips in increasing order of natural sugar. Modified Viz: Viz1.1 | U1_P: Vizi U2_P: Viz2 (Organic), Viz1.1 U3_P: Viz2 (Apple, Fat Free Potato Chip) | VL: Viz1.1 Added & voting requests sent to all Users. C: Viz1 (+2), Viz2 (+3): Organic |
| 7 | U1 and U3 give +1 to Viz1.1 | U1_P: Viz1 U2_P: Viz2 (Organic), Viz1.1 U3_P: Viz2 (Apple, Fat Free Potato Chip) | VL: Blank C: Viz1.1 (+2) Added, Viz2 (+3): Organic |

According to some embodiments, one or more computer processing apparatus may execute, process, facilitate, and/or otherwise be associated with one or more methods (e.g., generating predictive evaluations of data queries and/or query classification model training) described in this disclosure. The apparatus may be suitable, for example, for providing functionality of any of the dashboard controller and dashboard system, and/or may otherwise comprise a portion of the systems and subsystems described in this disclosure.

In some embodiments, the apparatus may comprise at least one processing device, input device, output device, communication device, and/or memory device. Fewer or more components and/or various configurations of the components may be included in the apparatus without deviating from the scope of embodiments described in this disclosure.

According to some embodiments, the processing device may be or include any type, quantity, and/or configuration of electronic and/or computerized processor that is or becomes known. The processing device may comprise, for example, an Intel® IXP 2800 network processor or an Intel® XEON™ Processor coupled with an Intel® E7501 chipset. In some embodiments, the processing device may comprise multiple inter-connected processors, microprocessors, and/or micro-engines. According to some embodiments, the processing device (and/or the apparatus and/or portions thereof) may be supplied power via a power supply such as a battery, an alternating current (AC) source, a direct current (DC) source, an AC/DC adapter, solar cells, and/or an inertial generator. In the case that the apparatus comprises a server such as a blade server, necessary power may be supplied via a standard AC outlet, power strip, surge protector, and/or uninterruptible power supply (UPS) device.

In some embodiments, the input device and/or the output device are communicatively coupled to the processing device (e.g., via wired and/or wireless connections and/or pathways) and they may comprise any types or configurations of input and output components and/or devices that are or become known, respectively. The input device may comprise, for example, a keyboard that allows an operator of the apparatus to interface with the apparatus (e.g., by a developer, such as to initiate an SQL statement evaluation process). The output device may, according to some embodiments, comprise a display screen and/or other practicable output component and/or device. The output device may, for example, provide an SQL evaluation interface to a developer (e.g., for inputting SQL query data). According to some embodiments, the input device and/or the output device may comprise and/or be embodied in a single device, such as a touch-screen monitor.

In some embodiments, the communication device may comprise any type or configuration of communication device that is or becomes known or practicable. The communication device may, for example, comprise a network interface card (NIC), a telephonic device, a cellular network device, a router, a hub, a modem, and/or a communications port or cable. In some embodiments, the communication device may be coupled to provide data to a developer device and/or a user device, such as in the case that the apparatus is configured to provide a data query evaluation process with predetermined model training and/or query performance parameters as described this disclosure. In some embodiments, the communication device may comprise an IR, RF, Bluetooth™, and/or Wi-Fi® network device coupled to facilitate communications between the processing device and another device (such as a developer device and/or a user device).

According to the example embodiment for an apparatus, the memory device may comprise any appropriate information storage device that is or becomes known or available, including, but not limited to, units and/or combinations of magnetic storage devices (e.g., a hard disk drive), optical storage devices, and/or semiconductor memory devices such as RAM devices, read only memory (ROM) devices, single data rate random access memory (SDR-RAM), double data rate random access memory (DDR-RAM), and/or programmable read only memory (PROM).

The memory device may, according to some embodiments, store one or more of model training instructions, recommendation instructions, and/or query prediction instructions. In some embodiments, software instructions and/or data stored in the memory device may be utilized by the processing device to provide output information via the output device and/or the communication device.

Any or all of the specialized instructions and data types described this disclosure and other practicable types of data may be stored in any number, type, and/or configuration of memory devices that is or becomes known. The memory device may, for example, comprise one or more data tables or files, databases, table spaces, registers, and/or other storage structures. In some embodiments, multiple databases and/or storage structures (and/or multiple memory devices) may be utilized to store information associated with the apparatus. According to some embodiments, the memory device may be incorporated into and/or otherwise coupled to the apparatus (e.g., as shown) or may simply be accessible to the apparatus (e.g., externally located and/or situated).

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may store program instructions, software, and/or modules that, when executed by a processing device, cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB key fob, dongle, and/or other type of flash memory data storage device that is or becomes known or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols. For a more exhaustive list of protocols, the term "network" is defined in this disclosure and includes many exemplary protocols that are also applicable in this disclosure.

In some embodiments, one or more specialized machines, such as a computerized processing device, a server, a remote terminal, and/or a user device may implement the various practices described in this disclosure.

Numerous embodiments are described in this disclosure and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The terms "an embodiment," "embodiment," "embodiments," "the embodiment," "the embodiments," "one or more embodiments," "some embodiments," "one embodiment" and the like mean "one or more (but not all) disclosed embodiments," unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "in this disclosure" means "in the present disclosure, including anything which may be incorporated by reference," unless expressly specified otherwise.

The phrase "at least one of," when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car, and a wheel.

The phrase "based on" does not mean "based only on," unless expressly specified otherwise. In other words, the phrase "based on" describes both "based only on" and "based at least on."

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a tablet computer" does not imply that any or all of the three items of that list are mutually exclusive and does not imply that any or all of the three items of that list are comprehensive of any category.

Headings of sections provided in this disclosure are for convenience only and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, organic LED (OLED), CRT, digital light processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p, 4k, or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch-screen features or associated keypads as is well understood.

The present disclosure may refer to a "control system." A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium).

As used in this disclosure, the term "network component" may refer to a user or network device, or a component, piece, portion, or combination of user or network devices. Examples of network components may include a static random-access memory (SRAM) device or module, a network processor, and a network communication path, connection, port, or cable.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication." As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a software, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

It will be readily apparent that the various methods and algorithms described in this disclosure may be implemented by, e.g., specially programmed computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input, and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A computer-implemented method for converting a natural language query into a structured database query, the computer-implemented method comprising:

receiving, by a dashboard controller system, natural language query text of a user, wherein the natural language query text is indicative of a request of the user for information from a database system;

transforming, by the dashboard controller system, each word of the natural language query text to a respective base lemma, thereby generating a set of transformed words corresponding to the natural language query text;

comparing, by the dashboard controller system, each transformed word of the set of transformed words to a database corpus of stored data elements to determine whether the transformed word has a respective matching data element in the database corpus, wherein the database corpus comprises a first data ecosystem;

based on the comparing, identifying a first unmatched transformed word of the set of transformed words that does not have a respective matching data element in the database corpus;

requesting, by the dashboard controller system, and from the user, a user input to assist in correlating the first unmatched transformed word;

receiving, by the dashboard controller system, and in response to the requesting, a user response, wherein the user response comprises an indication that the first unmatched transformed word matches a second data element of a second data ecosystem;

generating, by the dashboard controller system, a query builder collection based on the user response and the set of transformed words;

generating, by the dashboard controller system, a structured data query based on the query builder collection;

executing, by the dashboard controller system, the structured data query against at least one data table of the database system to generate a data query result;

selecting, by the dashboard controller system, a data visualization for the user;

generating, by the dashboard controller system, a display of the data query result via a personalized data query dashboard based on the selected data visualization for the user;

transmitting, by the dashboard controller system to the user, a request for feedback information about the generated display of the data query result;

receiving, by the dashboard controller system from the user, feedback information about the generated display of the data query result;

and updating at least one data module of the database system based on the feedback information.

2. The method of claim 1, further comprising:

retrieving a data lineage for the second data element of the second data ecosystem, wherein the data lineage comprises an indication of a data table and a data column; and requesting from the user an indication of whether to add the second data element of the second data ecosystem to the database corpus of the first data ecosystem.

3. The method of claim 1, further comprising:

after executing the structured data query, receiving, by the dashboard controller system from the user, a request of the user to add the second data element of the second data ecosystem to the database corpus of the first data ecosystem.

4. The method of claim 3, further comprising:

transmitting, by the dashboard controller system to a second user, a request for an indication of whether to add the second data element of the second data ecosystem to the database corpus of the first data ecosystem;

receiving, by the dashboard controller system from the second user, a vote on whether to add the second data element of the second data ecosystem to the database corpus of the first data ecosystem; and based on the received vote, determining, by the dashboard controller system, whether to update the database corpus of the first data ecosystem.

5. The method of claim 4, wherein determining whether to update the database corpus comprises:

determining, based on the received vote, whether a total number of votes to add the second data element to the database corpus is greater than a predetermined threshold.

6. The method of claim 1, further comprising:

adding the data visualization type indicator to a visualization analysis module.

7. The method of claim 1, further comprising:

adding the first unmatched transformed word to a stored list of stopwords for the database corpus.

8. The method of claim 1, wherein the user response includes uploaded data from the user that corresponds to the first unmatched transformed word, and further comprising:

adding the uploaded data to the database corpus.

9. The method of claim 1, further comprising:

storing, by the dashboard controller system, an indication of an association between the first unmatched transformed word and the second data element based on the user response.

10. The method of claim 9, further comprising:

updating a user intent collection associated with at least one user to store an indication of an association between the first unmatched transformed word and the second data element.

11. The method of claim 1, further comprising:

updating a stored accuracy metric based on the feedback information.

12. The method of claim 1, wherein transforming comprises:

identifying at least one multi-word element of the natural language query text.

13. The method of claim 1, wherein receiving the natural language query text of a user comprises:

receiving an audio input of the user; and converting the audio input into the natural language query text.

14. The method of claim 1, wherein generating the query builder collection based on the user response and the set of transformed words comprises:

identifying at least one data table of the database system based on the set of transformed words;

selecting a time-related formatting for the structured data query;

selecting an output type for the structured data query; and selecting an aggregation type for the structured data query.

15. The method of claim 1, wherein the user is associated with the personalized data query dashboard and with a community data query dashboard that is associated with at least one other user.

16. The method of claim 1, further comprising:

updating a shared data query dashboard that is associated with the user and at least one other user.

17. The method of claim 16, wherein updating the shared data query dashboard comprises one or more of:

adding at least one data visualization type to the shared data query dashboard;

updating at least one data visualization type of the shared data query dashboard; and deleting at least one data visualization type from the shared data query dashboard.

18. A computer-implemented method for converting a natural language query into a structured database query, the computer-implemented method comprising:

receiving, by a dashboard controller system, natural language query text of a user, wherein the natural language query text is indicative of a request of the user for information from a database system;

transforming, by the dashboard controller system, each word of the natural language query text to a respective base lemma, thereby generating a set of transformed words corresponding to the natural language query text;

comparing, by the dashboard controller system, each transformed word of the set of transformed words to a database corpus of stored data elements to determine whether the transformed word has a respective matching data element in the database corpus, wherein the database corpus comprises a first data ecosystem;

based on the comparing, identifying an unmatched transformed word of the set of transformed words that does not have a respective matching data element in the database corpus;

requesting from the user a user input to assist in correlating the unmatched transformed word;

receiving, by the dashboard controller system, and in response to the requesting, a user response, wherein the user response comprises an indication that the unmatched transformed word matches a data element of a second data ecosystem;

retrieving a data lineage for the data element of the second data ecosystem, wherein the data lineage comprises an indication of a data table and a data column;

generating, by the dashboard controller system, a query builder collection based on the user response and the set of transformed words;

generating, by the dashboard controller system, a structured data query based on the query builder collection;

and executing, by the dashboard controller system, the structured data query against at least one data table of the database system to generate a data query result.

19. The method of claim 18, further comprising:

requesting from the user an indication of whether to add the data element of the second data ecosystem to the database corpus of the first data ecosystem.

20. The method of claim 18, further comprising:

adding the data element of the second data ecosystem to the database corpus of the first data ecosystem.

* * * * *